United States Patent
Wen et al.

(10) Patent No.: US 12,216,874 B2
(45) Date of Patent: Feb. 4, 2025

(54) TOUCH STRUCTURE, DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ping Wen, Beijing (CN); Yuanqi Zhang, Beijing (CN); Chang Luo, Beijing (CN); Yi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/042,142

(22) PCT Filed: Jan. 26, 2022

(86) PCT No.: PCT/CN2022/074051
§ 371 (c)(1),
(2) Date: Feb. 17, 2023

(87) PCT Pub. No.: WO2023/141820
PCT Pub. Date: Aug. 3, 2023

(65) Prior Publication Data
US 2024/0272758 A1 Aug. 15, 2024

(51) Int. Cl.
*G06F 3/044* (2006.01)

(52) U.S. Cl.
CPC .......... *G06F 3/0448* (2019.05); *G06F 3/0445* (2019.05); *G06F 3/0446* (2019.05); *G06F 2203/04107* (2013.01); *G06F 2203/04112* (2013.01)

(58) Field of Classification Search
CPC .... G06F 3/0448; G06F 3/0445; G06F 3/0446; G06F 2203/04107; G06F 2203/04112
USPC ......................................................... 345/174
See application file for complete search history.

(56) References Cited

U.S. PATENT DOCUMENTS

| | | | | |
|---|---|---|---|---|
| 2018/0120988 A1* | 5/2018 | Kim | | G06F 3/0418 |
| 2021/0318770 A1* | 10/2021 | Joo | | G06F 3/0446 |

FOREIGN PATENT DOCUMENTS

| | | |
|---|---|---|
| CN | 109491544 A | 3/2019 |
| CN | 112711354 A | 4/2021 |
| CN | 113126834 A | 7/2021 |
| CN | 113485576 A | 10/2021 |

* cited by examiner

*Primary Examiner* — Mark Edwards
(74) *Attorney, Agent, or Firm* — IP & T GROUP LLP

(57) ABSTRACT

A touch structure includes first and second touch units. A first touch unit includes first touch electrodes and first connection portions; a second touch unit includes second touch electrodes and second connection portions. A first connection portion and a second connection portion cross to constitute an adjustment connection unit located in a corner region. A reference point where a first reference line and a second reference line intersecting each other is located outside the corner region and is located father away from a center of a main touch region than the adjustment connection unit. The corner region is located around the main touch region.

20 Claims, 13 Drawing Sheets

TOUCH STRUCTURE, DISPLAY PANEL AND DISPLAY DEVICE

CROSS-REFERENCE TO RELATED APPLICATION

The present application is a national phase entry under 35 USC 371 of International Patent Application No. PCT/CN2022/074051, filed on Jan. 26, 2022, which is incorporated herein by reference in its entirety.

TECHNICAL FIELD

The present disclosure relates to the field of display technology, and in particular, to a touch structure, a display panel and a display device.

BACKGROUND

As continuous development of electronic products, touch display devices with touch and display functions can achieve simple and flexible human-computer interaction, and thus they are widely used. A structure of a touch panel in a touch display device includes a one glass solution (OGS) touch panel, an On-Cell touch panel, and an In-Cell touch panel.

The On-Cell technique refers to that a touch function layer is disposed on a display side of the display panel. For example, the touch function layer is directly formed using a photolithography process on the thin film encapsulation layer (TFE) of the display panel.

SUMMARY

In an aspect, a touch structure is provided. The touch structure has a touch region; the touch region includes a main touch region and a corner region, and the corner region is located around the main touch region. The touch structure includes a plurality of first touch units and a plurality of second touch units, the plurality of first touch units extend in a first direction, a first touch unit includes a plurality of first touch electrodes and a plurality of first connection portions, and a first connection portion is electrically connected to two adjacent first touch electrodes. The plurality of second touch units extend in a second direction, a second touch unit includes a plurality of second touch electrodes and a plurality of second connection portions, and a second connection portion is electrically connected to two adjacent second touch electrodes; the first direction intersects the second direction.

An orthogonal projection of the first connection portion on a reference surface intersects an orthogonal projection of the second connection portion on the reference surface, the first connection portion and the second connection portion, whose orthogonal projections on the reference surface intersect each other, constitute a connection unit; at least one of a plurality of connection units composed of the plurality of first connection portions and the plurality of second connection portions is an adjustment connection unit, and the adjustment connection unit is located in the corner region.

In a first touch unit in which a first connection portion of the adjustment connection unit is located, a straight line passing through centers of at least two first touch electrodes located in the main touch region is a first reference line. In a second touch unit in which a second connection portion of the adjustment connection unit is located, a straight line passing through centers of at least two second touch electrodes located in the main touch region is a second reference line. An intersection point of the first reference line and the second reference line is a reference point. The reference point is located outside the corner region, and is located father away from a center of the main touch region than the adjustment connection unit.

In some embodiments, the plurality of first touch units and the plurality of second touch units intersect one another to constitute a plurality of capacitive units; the plurality of capacitive units are arranged in a plurality of rows in the first direction, and arranged in a plurality of columns in the second direction.

A capacitive unit includes a single connection unit, opposite portions of two first touch electrodes connected to a first connection portion of the single connection unit, and opposite portions of two second touch electrodes connected to a second connection portion of the single connection unit.

A capacitive unit including the adjustment connection unit is a compensation capacitive unit, a capacitive unit located in a same row with and adjacent to the compensation capacitive unit is a first capacitive unit, and a capacitive unit located in a same column with and adjacent to the compensation capacitive unit is a second capacitive unit. The compensation capacitive unit, the first capacitive unit and the second capacitive unit are all located in the corner region.

In some embodiments, an area of the first capacitive unit and an area of the second capacitive unit are each larger than an area of the compensation capacitive unit, and are each smaller than an area of a capacitive unit located in the main touch region.

In some embodiments, the compensation capacitive unit is divided by a third reference line into a first capacitive sub-unit and a second capacitive sub-unit; the third reference line is a straight line extending through a center of the adjustment connection unit and extending in the second direction; the first capacitive sub-unit is closer to the first capacitive unit than the second capacitive sub-unit; a ratio of an area of the first capacitive sub-unit and an area of the second capacitive sub-unit is a first ratio.

A ratio of a difference between an area of the first capacitive unit and an area of a capacitive unit located in the main touch region and a difference between an area of the second capacitive unit and the area of the capacitive unit located in the main touch region is a second ratio. The first ratio is substantially equal to the second ratio.

In some embodiments, a sum of a mutual capacitance value of the first capacitive unit, a mutual capacitance value of the second capacitive unit and a mutual capacitance value of the compensation capacitive unit is approximately twice a mutual capacitance value of a capacitive unit located in the main touch region.

In some embodiments, shapes of the compensation capacitive unit, the first capacitive unit and the second capacitive unit are each different from a shape of a capacitive unit located in the main touch region.

In some embodiments, two first touch electrodes connected to the first connection portion of the adjustment connection unit are respectively a first electrode and a second electrode, and the first electrode is located farther away from the center of the main touch region than the second electrode in the first direction. Two second touch electrodes connected to the second connection portion of the adjustment connection unit are respectively a third electrode and a fourth electrode, and the third electrode is located farther away from the center of the main touch region than the fourth electrode in the second direction.

Shapes of contours, that are close to each other, of the first electrode and the third electrode are complementary, and shapes of contours, that are close to each other, of the first electrode and the fourth electrode are complementary; and/or shapes of contours, that are close to each other, of the second electrode and the third electrode are complementary, and shapes of contours, that are close to each other, of the second electrode and the fourth electrode are complementary.

In some embodiments, edges of the first electrode and the third electrode each have at least one first branch, the at least one first branch of the first electrode extends into the third electrode, and the at least one first branch of the third electrode extends into the first electrode.

In some embodiments, edges of the first electrode and the fourth electrode each have at least one protrusion, and a shape of the at least one protrusion of the first electrode matches a shape of the at least one protrusion of the fourth electrode. Edges of the second electrode and the third electrode each have at least one protrusion, and a shape of the at least one protrusion of the second electrode matches a shape of the at least one protrusion of the third electrode.

In some embodiments, edges of the first electrode and the fourth electrode each have at least one first branch, the at least one first branch of the first electrode extends into the fourth electrode, and the at least one first branch of the fourth electrode extends into the first electrode. Edges of the second electrode and the third electrode each have at least one first branch, the at least one first branch of the second electrode extends into the third electrode, and the at least one first branch of the third electrode extends into the second electrode.

In some embodiments, the edges of the first electrode and the third electrode each have at least one protrusion, and a shape of the at least one protrusion of the first electrode matches a shape of the at least one protrusion of the third electrode.

In some embodiments, edges of the second electrode and the fourth electrode each have at least one protrusion, and a shape of the at least one protrusion of the second electrode matches a shape of the at least one protrusion of the fourth electrode.

In some embodiments, a shape of a protrusion includes a triangle, a rectangle, a trapezoid, a circle, or an ellipse.

In some embodiments, a height of a first branch is greater than a height of a protrusion.

In some embodiments, an edge of a first touch electrode and/or a second touch electrode located in the main region has at least one second branch. A height of a second branch is greater than a height of a first branch.

In some embodiments, a first branch is in a shape of a long strip.

In some embodiments, edges of the first electrode, the second electrode, the third electrode, and the fourth electrode each have at least one protrusion. A shape of the at least one protrusion of the first electrode matches a shape of the at least one protrusion of the third electrode and a shape of the at least one protrusion of the fourth electrode. A shape of the at least one protrusion of the second electrode matches a shape of the at least one protrusion of the third electrode and a shape of the at least one protrusion of the fourth electrode.

In some embodiments, two first touch electrodes connected to the first connection portion of the adjustment connection unit are respectively a first electrode and a second electrode, and the first electrode is located farther away from the center of the main touch region than the second electrode in the first direction. Two second touch electrodes connected to the second connection portion of the adjustment connection unit are respectively a third electrode and a fourth electrode, and the third electrode is located farther away from the center of the main touch region than the fourth electrode in the second direction.

An area of the second electrode is larger than an area of the first electrode and smaller than an area of a first touch electrode located in the main touch region. An area of the fourth electrode is larger than an area of the third electrode and smaller than an area of a second touch electrode located in the main touch region.

In some embodiments, shapes of two first touch electrodes connected to the first connection portion of the adjustment connection unit and a shape of a first touch electrode located in the main touch region are different from one another. Shapes of two second touch electrodes connected to the second connection portion of the adjustment connection unit and a shape of a second touch electrode located in the main touch region are different from one another.

In some embodiments, at least one first touch electrode of the plurality of first touch electrodes is provided therein with at least one first dummy electrode, and a first dummy electrode is disconnected from a respective first touch electrode; and/or at least one second touch electrode of the plurality of second touch electrodes is provided therein with at least one first dummy electrode is disposed within the, and a first dummy electrode is disconnected from a respective second touch electrode.

In some embodiments, a first touch electrode or a second touch electrode located in the corner region is provided therein with at least one first dummy electrode, and a first touch electrode or a second touch electrode located in the main touch region is provided therein with at least one first dummy electrode; an area of a first dummy electrode in the first touch electrode or the second touch electrode located in the corner region is less than or equal to an area of a first dummy electrode in the first touch electrode or the second touch electrode located in the main touch region.

In some embodiments, in two first touch electrodes connected to the first connection portion of the adjustment connection unit, a first dummy electrode, away from the center of the main touch region in the first direction, is provided therein with no first dummy electrode. In two second touch electrodes connected to the second connection portion of the adjustment connection unit, a second touch electrode, away from the center of the main touch region in the second direction, is provided therein with no first dummy electrode.

In some embodiments, in two first touch electrodes connected to the first connection portion of the adjustment connection unit, a first touch electrode away from the center of the main touch region in the first direction is a first electrode. In two second touch electrodes connected to the second connection portion of the adjustment connection unit, a second touch electrode away from the center of the main touch region in the second direction is a third electrode.

The touch structure further includes a plurality of first touch lines and a plurality of second touch lines; one or more first touch lines are electrically connected to the first electrode, and one or more second touch lines are electrically connected to the third electrode. An orthogonal projection of at least one first touch line of the plurality of first touch lines on the reference surface is non-overlapping with an orthogonal projection of at least one second touch line of the plurality of second touch lines on the reference surface.

In some embodiments, two first touch electrodes connected to the first connection portion of the adjustment connection unit are respectively a first electrode and a second electrode, and two second touch electrodes connected to the second connection portion of the adjustment connection unit are respectively a third electrode and a fourth electrode.

The touch structure includes a first conductive layer, an insulating layer and a second conductive layer that are sequentially stacked. The insulating layer is located between the first conductive layer and the second conductive layer, and the insulating layer is provided therein with a plurality of via holes. The first electrode, the second electrode, the third electrode, the fourth electrode and the first connection portion of the adjustment connection unit are disposed in the first conductive layer, and the second connection portion of the adjustment connection unit is disposed in the second conductive layer, the first electrode is directly electrically connected to the second electrode through the first connection portion in the first direction, and the second connection portion is electrically connected to the third electrode and the fourth electrode through different via holes in the second direction.

Alternatively, the first electrode, the second electrode, the third electrode, the fourth electrode and the second connection portion of the adjustment connection unit are disposed in the first conductive layer, and the first connection portion of the adjustment connection unit is disposed in the second conductive layer. The third electrode is directly electrically connected to the fourth electrode through the second connection portion in the second direction, and the first connection portion is electrically connected to the first electrode and the second electrode through different via holes in the first direction.

In some embodiments, the first connection portion and the second connection portion of the adjustment connection unit, two first touch electrodes connected to the first connection portion of the adjustment connection unit, and two second touch electrodes connected to the second connection portion of the adjustment connection unit are each of a metal mesh structure.

In some embodiments, the plurality of first touch units intersect the plurality of second touch units to constitute a plurality of capacitive units. The plurality of capacitive units are arranged in a plurality of rows in the first direction and arranged in a plurality of columns in the second direction.

The touch structure further includes a second dummy electrode disposed in a gap region between capacitive units that are adjacent to one another.

In another aspect, a display panel is provided. The display panel includes a display substrate and the touch structure according to any one of the embodiments described above. The touch structure is disposed on a light exit side of the display substrate.

In yet another aspect, a display device is provided. The display device includes the display panel as described in the embodiments above.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings.

In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
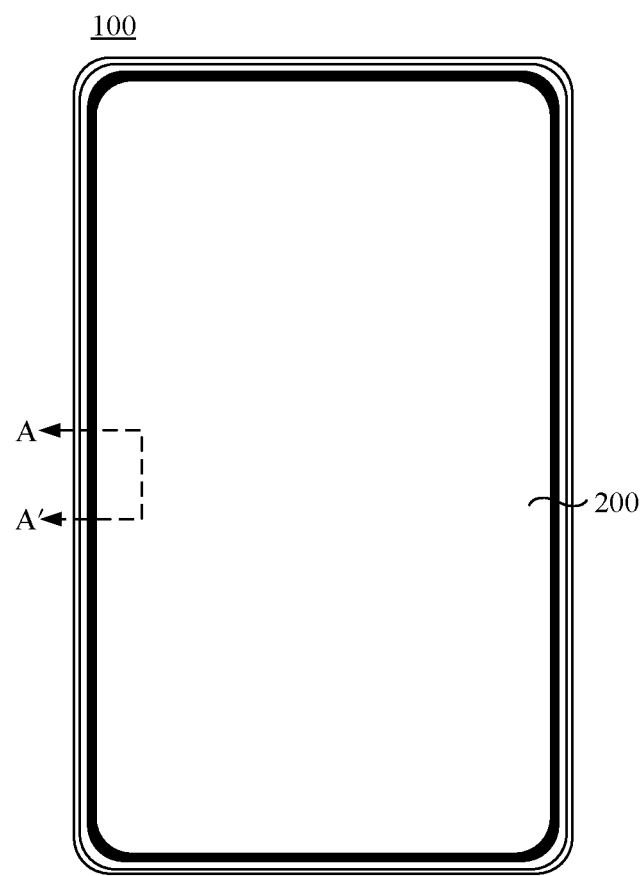
FIG. 1 is a top view of a display device, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example"

or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the quantity of indicated technical features. Thus, a feature defined with the term such as "first" or "second" may explicitly or implicitly include one or more of the features. In the description of the embodiments of the present disclosure, the term "a plurality of/the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

Additionally, the phrase "based on" as used herein is meant to be open and inclusive, since a process, step, calculation or other action that is "based on" one or more of the stated conditions or values may, in practice, be based on additional conditions or values beyond those stated.

As used herein, the terms such as "about", "substantially" or "approximately" include a stated value and an average value within an acceptable range of deviation of a particular value. The acceptable range of deviation is determined by a person of ordinary skill in the art, in consideration of the measurement in question and errors associated with the measurement of a particular quantity (i.e., limitations of the measurement system).

As used herein, the term such as "parallel" "perpendicular" or "equal" includes the cases set forth, as well as instances similar to those set forth, that are within an acceptable range of deviations. The acceptable range of deviation is determined by a person of ordinary skill in the art, in consideration of the measurement in question and errors associated with the measurement of a particular quantity (i.e., limitations of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be, for example, a difference between two equals of less than or equal to 5% of either of the two equals.

It will be understood that, when a layer or element is referred to as being on another layer or substrate, it can be directly on the another layer or substrate or an intervening layer provided between the layer or element and the another layer or substrate.

Exemplary embodiments are described herein with reference to segmental views and/or plan views as idealized exemplary drawings. In the accompanying drawings, thickness of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but as including shape deviations due to, for example, manufacturing. For example, an etched region that is shown in a rectangle generally has a curved feature. Therefore, the regions shown in the accompanying drawings are schematic in nature, and their shapes are not intended to show actual shapes of regions in an apparatus, and are not intended to limit the scope of the exemplary embodiments.

FIG. 1 is a top view of a display device, in accordance with some embodiments.

Referring to FIG. 1, the display device 100 provided by some embodiments of the present disclosure includes a display panel 200.

The display device 100 may be a liquid-crystal display (LCD). Alternatively, the display device 100 may be an electroluminescent display device or a photoluminescent display device. In a case where the display device 100 is the electroluminescent display device, the electroluminescent display device may be an organic light-emitting diode (OLED) display device or a quantum dot light-emitting diode (QLED) display device. In a case where the display device 100 is the photoluminescent display device, the photoluminescent display device may be a quantum dot photoluminescent display device.

The display device 100 may be any device that displays images whether in motion (e.g., a video) or stationary (e.g., a static image), and whether textual or graphical. More specifically, it is anticipated that the display device provided in the embodiments may be implemented in a variety of electronic devices or associated with a variety of electronic devices. The variety of electronic devices include (but are not limited to): mobile phones, wireless devices, personal data assistants (PDAs), hand-held or portable computers, GPS receivers/navigators, cameras, MP4 video players, video cameras, game consoles, watches, clocks, calculators, television monitors, flat panel displays, computer monitors, automobile displays (e.g., odometer displays), navigators, cockpit controllers and/or displays, displays of camera views (e.g., displays of rear-view cameras in vehicles), electronic photos, electronic billboards or signs, projectors, building structures, and packaging and aesthetic structures (e.g., displays for displaying an image of a piece of jewelry).

The following embodiments of the present disclosure are illustrated by taking an example in which the display device 100 is an electroluminescent display device. In this case, the display panel 200 is an electroluminescent display panel.

Figure 2:
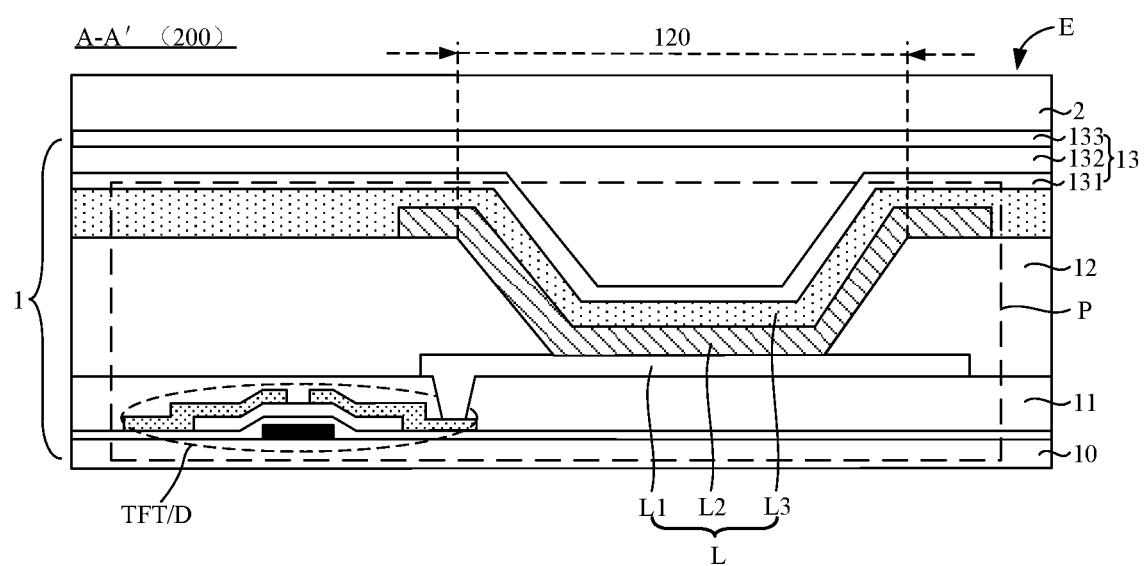
FIG. 2 is a sectional view of a display panel of the display device in FIG. 1 along a section line A-A'.

FIG. 2 is a sectional view of the display panel in FIG. 1 along the section line A-A'.

In some embodiments, as shown in FIG. 2, the display panel 200 includes a display substrate 1 and a touch structure 2, and the touch structure 2 is disposed on a light exit side E of the display substrate 1.

As shown in FIG. 2, the display substrate 1 includes a base substrate 10 and a plurality of sub-pixels P disposed on the base substrate 10. Each sub-pixel P includes a pixel driving circuit D and a light-emitting device L that are disposed on the base substrate 10. The pixel driving circuit D includes a plurality of thin film transistors TFT. The light-emitting device L includes an anode L1, a light-emitting function layer L2 and a cathode L3, and the anode L1 is electrically connected to a drain (or a source) of a thin film transistor TFT serving as a driving transistor in the plurality of thin film transistors TFT.

As shown in FIG. 2, the display substrate 1 further includes a planarization layer 11 disposed between the thin film transistor TFT and the anode L1.

As shown in FIG. 2, the display substrate 1 further includes a pixel definition layer 12, and the pixel definition layer 12 includes a plurality of open regions 120; a light-emitting device L is disposed in an open region 120. In some embodiments, the light-emitting function layer L2 includes a light-emitting layer. In some other embodiments, in addition to the light-emitting layer, the light-emitting function layer L2 further includes one or more of an electron transporting layer (ETL), an electron injection layer (EIL), a hole transporting layer (HTL) and a hole injection layer (HIL).

The display panel 200 may be a top emission display panel. In this case, the anode L1 proximate to the base substrate 10 is opaque, and the cathode L3 away from the base substrate 10 is transparent or translucent. Alternatively, the display panel 200 may be a bottom emission display panel. In this case, the anode L1 proximate to the base substrate 10 is transparent or translucent, and the cathode L3 away from the base substrate 10 is opaque. Alternatively, the display panel 200 may be a double-sided light emission display panel. In this case, the anode L1 proximate to the base substrate 10 and the cathode L3 away from the base substrate 10 are both transparent or translucent.

In some embodiments, as shown in FIG. 2, the display substrate 1 further includes a thin film encapsulation layer 13 disposed on a side of the light-emitting device L away from the base substrate 10.

For example, the thin film encapsulation layer 13 includes a first inorganic barrier layer 131, an organic barrier layer 132, and a second inorganic barrier layer 133. The first inorganic barrier layer 131, the organic barrier layer 132, and the second inorganic barrier layer 133 are sequentially stacked on a side of the light-emitting device L away from the base substrate 10. The first inorganic barrier layer 131 and the second inorganic barrier layer 133 have a function of blocking moisture and oxygen, and the first organic barrier layer 132 has certain flexibility and a function of absorbing moisture, so that the formed thin film encapsulation layer 13 has good packaging performance.

In some embodiments, as shown in FIG. 2, by using the structural design of the On-Cell technology, the touch structure 2 is disposed directly on the thin film encapsulation layer 13. That is, there are no other film layers between the touch structure 2 and the thin film encapsulation layer 13, which is beneficial to reducing the thickness of the display panel 200, so as to achieve the lightness and thinness of the display panel 200.

Figure 3:
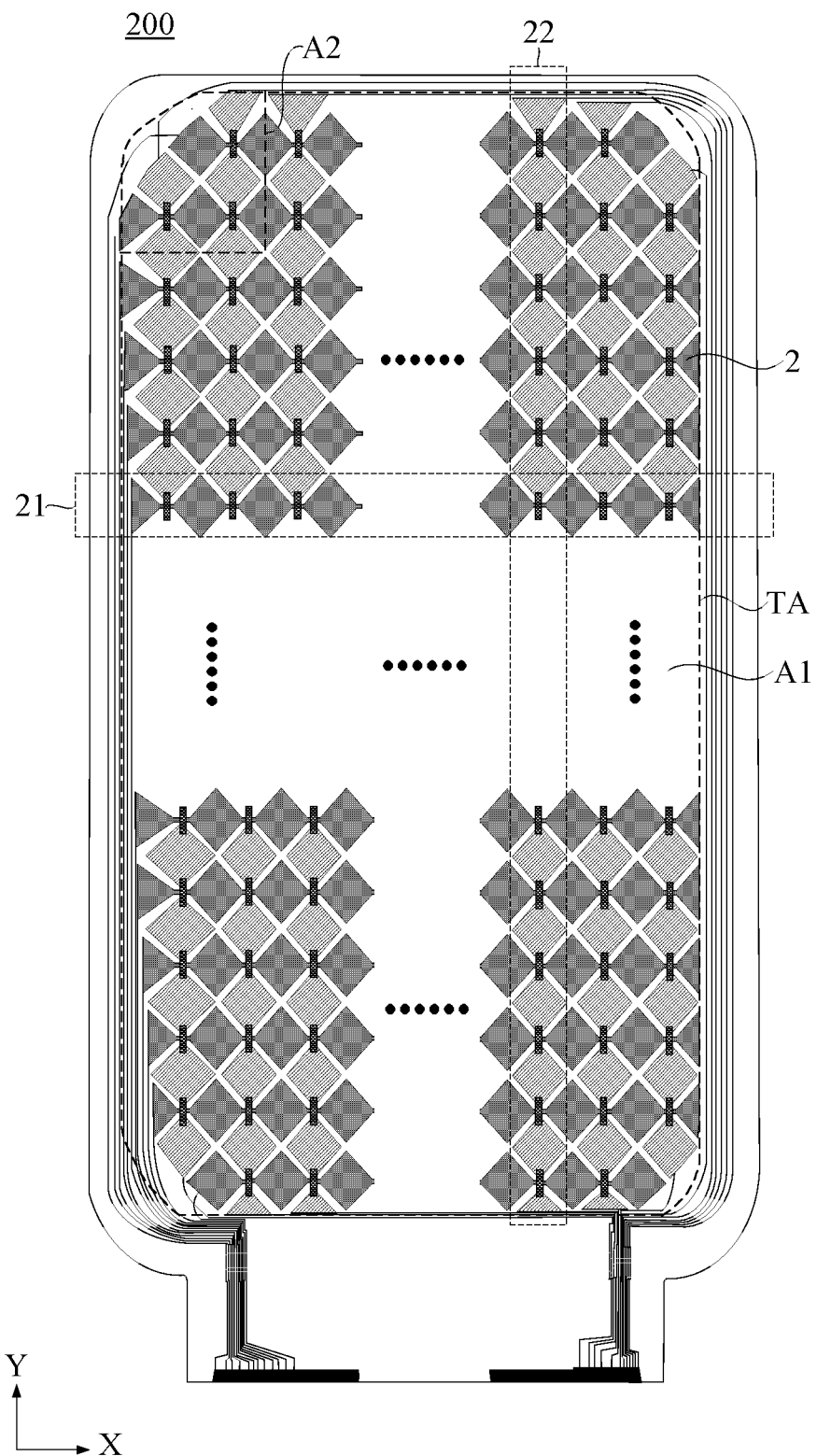
FIG. 3 is a top view of a display panel, in accordance with some embodiments.
Figure 4:
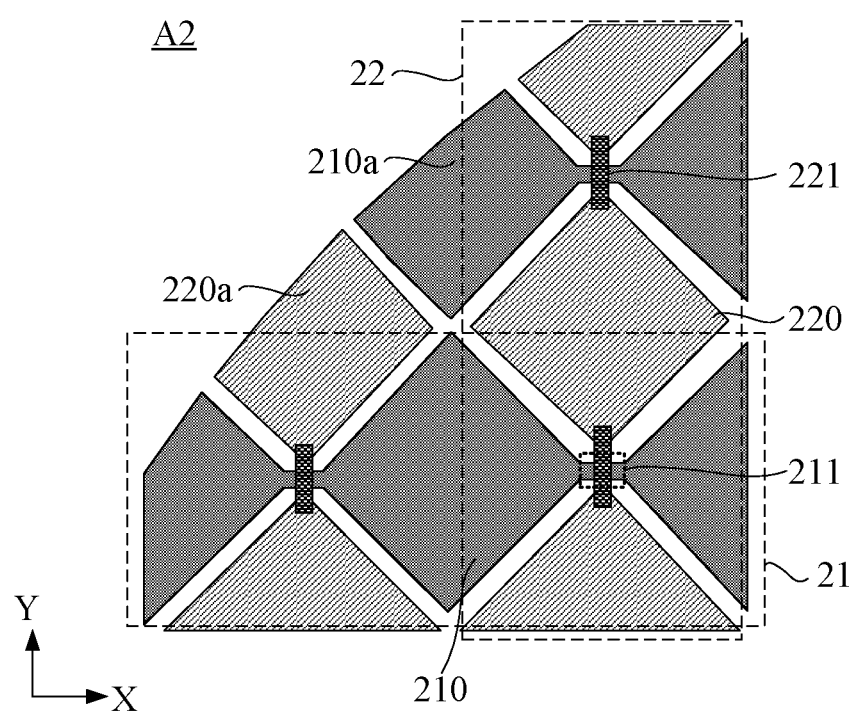
FIG. 4 is a partial enlargement view of the display panel of FIG. 3 in a corner region.

FIG. 3 is a top view of a display panel, in accordance with some embodiments; and FIG. 4 is a partial enlargement view of the display panel in FIG. 3 in the corner region.

Referring to FIG. 3, the display panel 200 includes the touch structure 2, and the touch structure 2 has a touch region TA; the touch region TA includes a main touch region A1 and a corner region A2, and the corner region A2 is located around the main touch region A1.

Referring to FIG. 3, the touch structure 2 includes a plurality of first touch units 21 and a plurality of second touch units 22, and the plurality of first touch units 21 each extend in a first direction X. Referring to FIG. 4, a first touch unit 21 includes a plurality of first touch electrodes 210 and a plurality of first connection portions 211, the first touch electrodes 210 and the first connection portions 211 are alternately arranged in the first direction X. That is, a first connection portion 211 is electrically connected to two adjacent first touch electrodes 210.

Continue to refer to FIG. 3, the plurality of second touch units 22 each extend in a second direction Y. Referring to FIG. 4, the second touch unit 22 includes a plurality of second touch electrodes 220 and a plurality of second connection portions 221, the second touch electrodes 220 and the second connection portions 221 are alternately arranged in the second direction Y. That is, a second connection portion 221 is electrically connected to two adjacent second touch electrodes 220.

It will be noted that, one of the first touch electrode 210 and the second touch electrode 220 is a touch driving electrode (TX), and the other thereof is a touch sensing electrode (RX). A side surface of the first touch electrode 210 is opposite directly to a side surface of the second touch electrode 220 adjacent thereto. When electrical signals are respectively transmitted on the first touch electrode 210 and the second touch electrode 220, a mutual capacitance value is generated between the adjacent first touch electrode 210 and the second touch electrode 220. During the finger touch the display panel 200, the finger will carry away the charge on the touch electrodes, so that the mutual capacitance value between the touch electrodes at the touch position changes. The touch integrated circuit (IC) in the display panel 200 can detect the change amount of the mutual capacitance value between the touch electrodes, so as to identify the touch position of the finger. Thus, the touch function of the display panel 200 is achieved.

The first direction X intersects the second direction Y. For example, the first direction X is perpendicular to the second direction Y.

The inventors of the present disclosure have discovered that, since the display panel 200 described above adopts a rounded corner design (that is, an edge of the display panel 200 in the corner region A2 is designed to be curved), compared with the patterns of the touch electrodes (the first touch electrode 210 and the second touch electrode 220) in the main touch region A1, the patterns of some touch electrodes (e.g., the touch electrodes 210a and the touch electrodes 220a proximate to the edge of the corner region A2) in the corner region A2 are incomplete. Thus, a facing area between the some touch electrodes located in the corner region A2 is reduced caused by a fact that a side of each of these touch electrodes proximate to the edge of the corner region A2 is not connected to other touch electrodes, so that a mutual capacitance value between the some touch electrodes located in the corner region A2 is smaller than a mutual capacitance value between the touch electrodes located in the main touch region A1. As a result, the touch performance of the display panel 200 in the corner region A2 is poorer than the touch performance of the display panel 200 in the main touch region A1.

Figure 5:
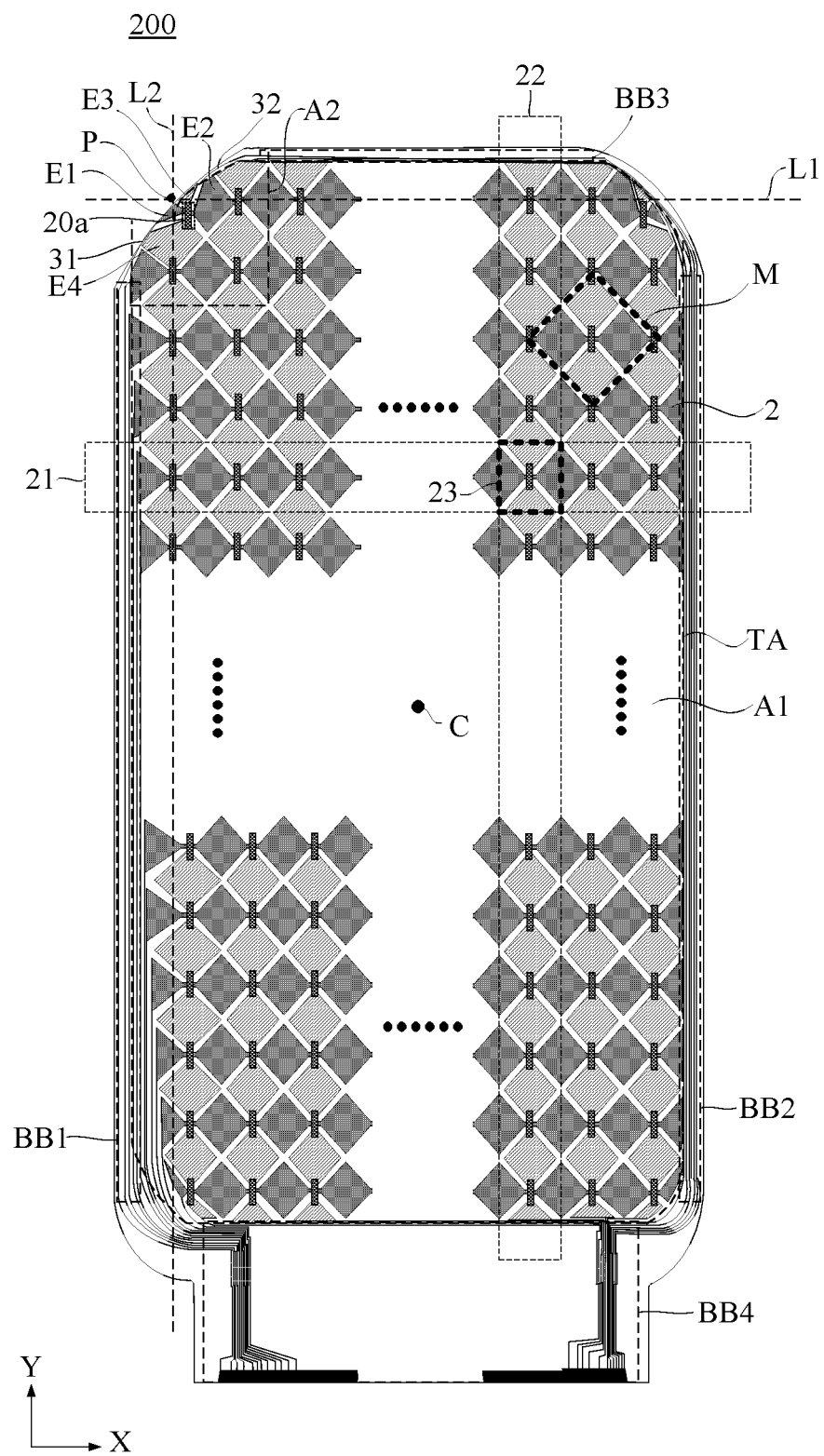
FIG. 5 is a top view of another display panel, in accordance with some embodiments.
Figure 6A:
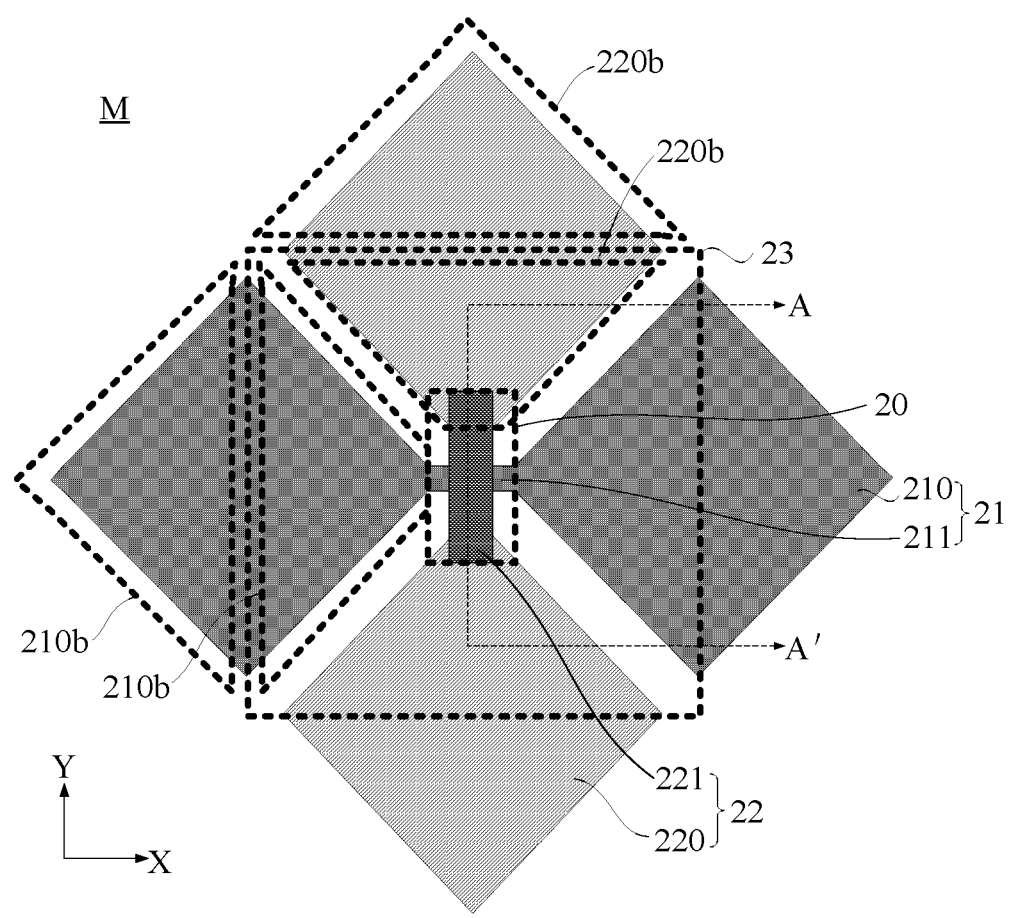
FIG. 6A is a partial enlargement view of the display panel of FIG. 5 in the region M.
Figure 6B:
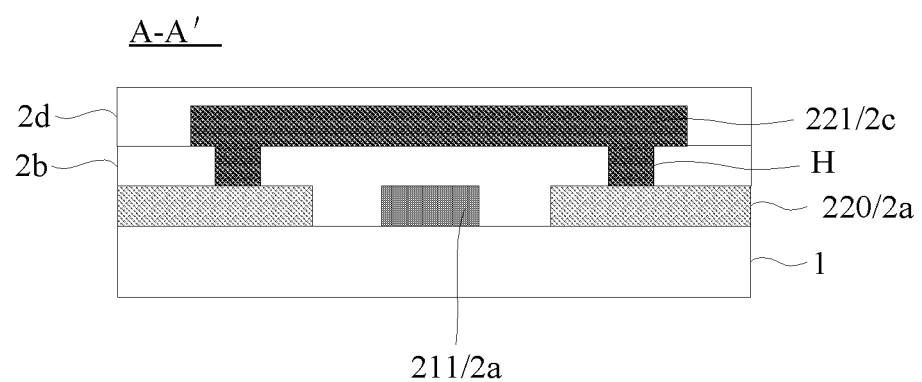
FIG. 6B is a sectional view of the display panel in FIG. 6A along the section line A-A'.
Figure 6C:
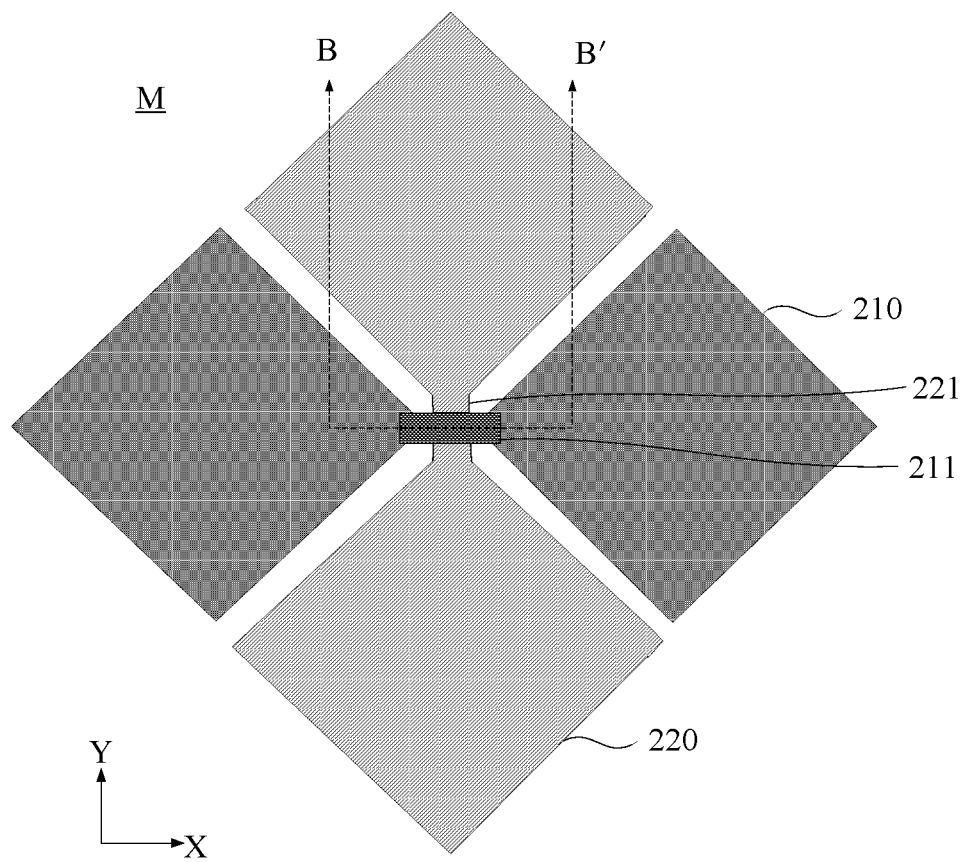
FIG. 6C is a partial enlargement view of the display panel in FIG. 5 in the region M, in accordance with some other embodiments.
Figure 6D:
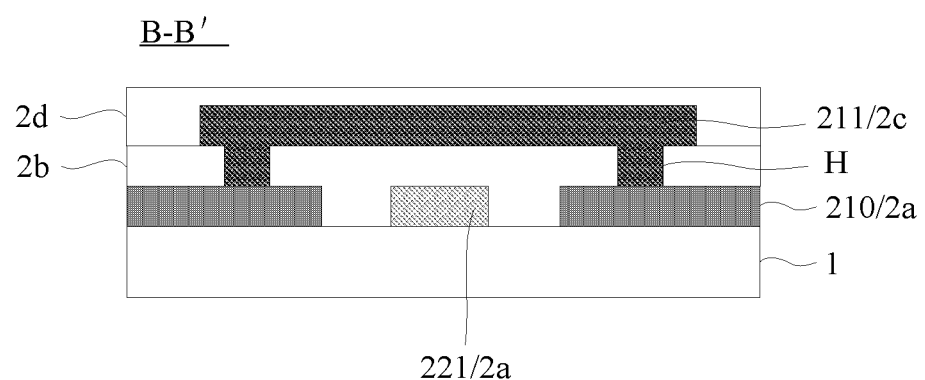
FIG. 6D is a sectional view of the display panel in FIG. 6C along the section line B-B'.
Figure 7A:
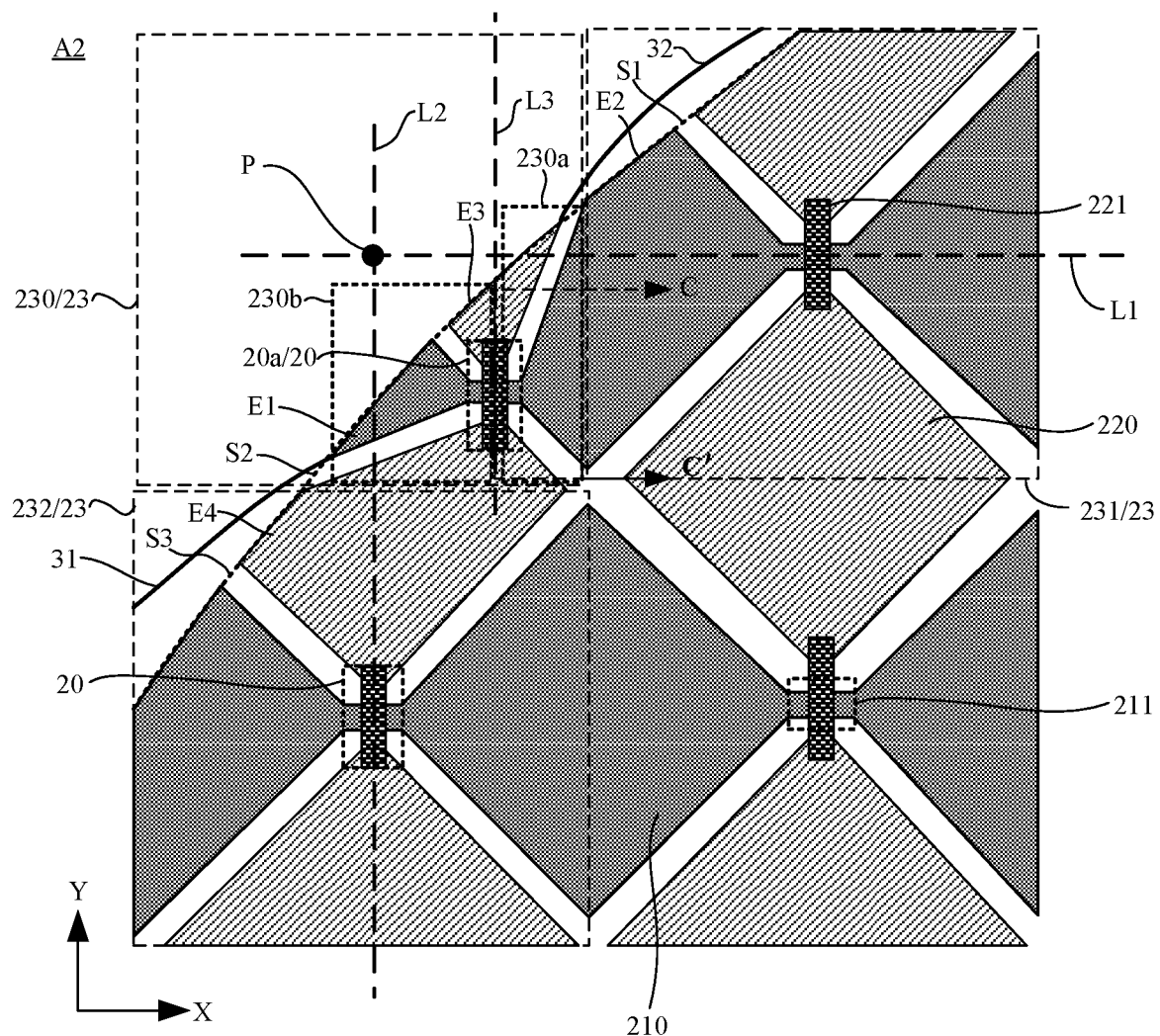
FIG. 7A is a partial enlargement view of the display panel in FIG. 5 in the corner region.
Figure 7B:
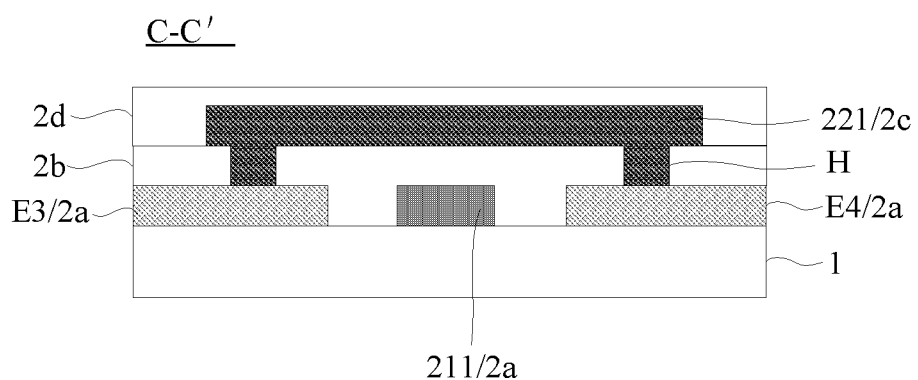
FIG. 7B is a sectional view of the display panel in FIG. 7A along the section line C-C'.
Figure 7C:
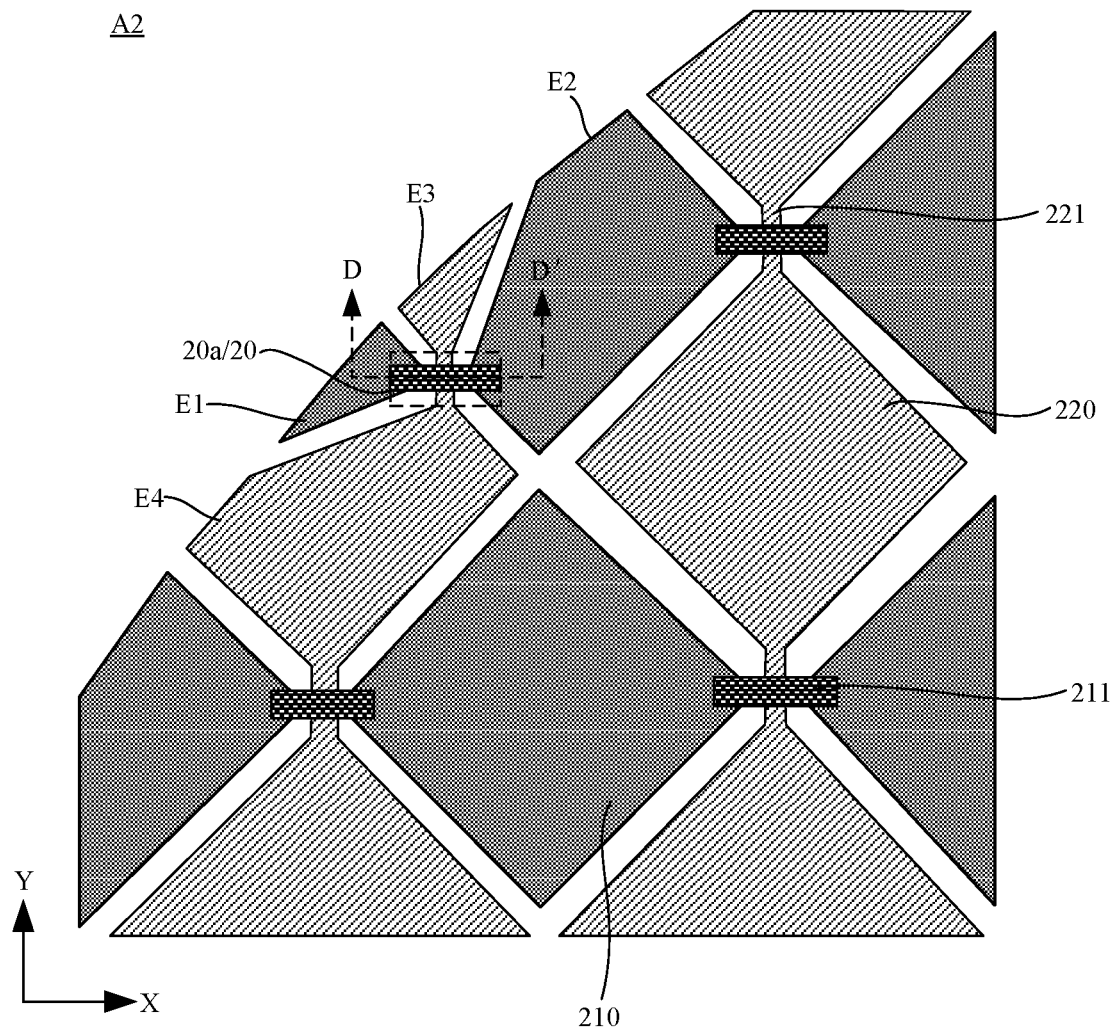
FIG. 7C is a partial enlargement view of a display panel in a corner region, in accordance with some other embodiments.
Figure 7D:
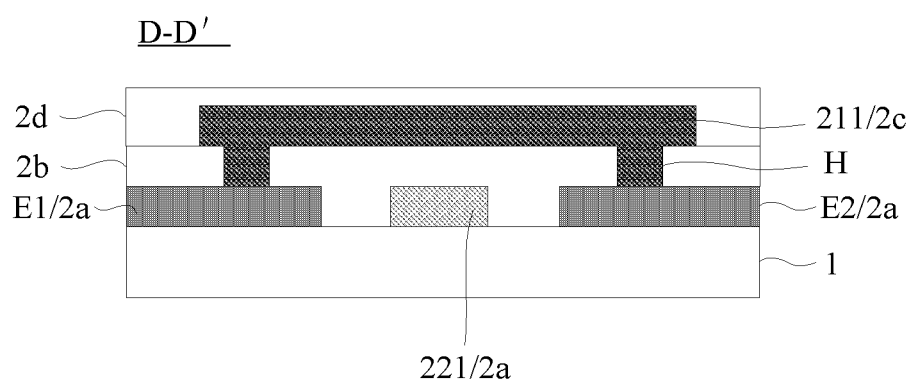
FIG. 7D is a sectional view of the display panel in FIG. 7C along the section line D-D'.

In order to solve the above problems, some embodiments of the present disclosure provide a display panel, FIG. 5 is a top view of a display panel, in accordance with some embodiments; FIG. 6A is a partial enlargement view of the display panel of FIG. 5 in the region M; FIG. 6B is a sectional view of the display panel in FIG. 6A along the section line A-A'; FIG. 6C is a partial enlargement view of the display panel in the region M, in accordance with some other embodiments; FIG. 6D is a sectional view of the display panel in FIG. 6C along the section line B-B'; FIG. 7A is a partial enlargement view of the display panel in FIG. 5 in the corner region; FIG. 7B is a sectional view of the display panel in FIG. 7A along the section line C-C'; FIG. 7C is a partial enlargement view of the display panel in the corner region, in accordance with some other embodiments; FIG. 7D is a sectional view of the display panel in FIG. 7C along the section line D-D'.

Referring to FIG. 5, the display panel 200 includes a touch structure 2, the touch structure 2 has a touch region TA, and the touch region TA includes a main touch region A1 and a corner region A2.

Referring to FIG. 5, the touch structure 2 includes a plurality of first touch units 21 and a plurality of second touch units 22, and the plurality of first touch units 21 each extend in the first direction X. Referring to FIG. 6A, a first touch unit 21 includes a plurality of first touch electrodes 210 and a plurality of first connection portions 211, the first touch electrodes 210 and the first connection portions 211 are alternately arranged in the first direction X. That is, a first connection portion 211 is electrically connected to two adjacent first touch electrodes 210.

Continue to refer to FIG. 5, the plurality of second touch units 22 each extend in the second direction Y. Referring to FIG. 6A, a second touch unit 22 includes a plurality of second touch electrodes 220 and a plurality of second connection portions 221, the second touch electrodes 220 and the second connection portions 221 are alternately arranged in the second direction Y. That is, a second connection portion 221 is electrically connected to two adjacent second touch electrodes 220.

The manner in which the connection portion is connected to the two adjacent touch electrodes is described below from the perspective of the film layer structure.

Referring to FIG. 6B, the touch structure 2 includes a first conductive layer 2a, an insulating layer 2b, and a second conductive layer 2c that are sequentially stacked. The insulating layer 2b is located between the first conductive layer 2a and the second conductive layer 2c, and the insulating layer 2b is provided therein with a plurality of via holes H.

It will be noted that, the first conductive layer 2a may be located on a side of the second conductive layer 2c proximate to or away from the display substrate 1, and the following embodiments of the present disclosure are illustrated by taking an example in which the first conductive layer 2a is disposed on a side of the second conductive layer 2c proximate to the display substrate 1.

Continue to refer to FIG. 6B, the first touch electrode 210 (not shown in FIG. 6B), the second touch electrode 220 and the first connection portion 211 are located in the first conductive layer 2a, and the second connection portion 221 is located in the second conductive layer 2c. In the first direction X, two adjacent first touch electrodes 210 are directly electrically connected to each other through the first connection portion 211. In the second direction Y, the second connection portion 221 is electrically connected to two adjacent second touch electrodes 220 through different via holes H in the insulating layer 2b.

Alternatively, referring to FIGS. 6C and 6D, the first touch electrode 210, the second touch electrode 220 and the second connection portion 221 are located in the first conductive layer 2a, and the first connection portion 211 is located in the second conductive layer 2c. In the second direction Y, two adjacent second touch electrodes 220 are directly electrically connected to each other through the second connection portion 221. In the first direction X, the first connection portion 211 is electrically connected to two adjacent first touch electrodes 210 through different via holes H in the insulating layer 2b.

In addition, referring to FIGS. 6B and 6D, the touch structure 2 further includes a protection layer 2d disposed on a side of the second conductive layer 2c away from the display substrate 1 for protection and insulation.

The structure design of the touch structure 2 adopts the Flexible Multi-Layer On Cell (FMLOC) technique. That is, two conductive layers are used to form the first touch electrode 210, the second touch electrode 220, the first connection portion 211 and the second connection portion 221.

As shown in FIGS. 6A and 7A, an orthogonal projection of the first connection portion 211 on a reference surface and an orthogonal projection of the second connection portion 221 on the reference surface intersect, and the first connection portion 211 and the second connection portion 221, whose orthogonal projections on the reference surface intersect each other, constitute a connection unit 20. As shown in FIG. 7A, at least one of a plurality of connection units 20 composed of the plurality of first connection portions 211 and the plurality of second connection portions 221 is an adjustment connection unit 20a, and the adjustment connection unit 20a is located in the corner region A2.

It will be noted that the term "reference surface" may be a plane in which the display substrate 1 is located, may be a plane in which the touch structure 2 is located, or may be a plane in which the first direction X and the second direction Y are located in FIG. 5.

In conjunction with FIGS. 5 and 7A, in the first touch unit 21 in which the first connection portion 211 of the connection unit 20a is located, a straight line passing through centers of at least two first touch electrodes 210 located in the main touch region A1 is a first reference line L1; in the second touch unit 22 in which the second connection portion 221 of the connection unit 20a is located, a straight line passing through centers of at least two second touch electrodes 220 located in the main touch region A1 is a second reference line L2. An intersection point of the first reference line L1 and the second reference line L2 is a reference point P. The reference point P is located outside the corner region A2, and the reference point P is located farther away from a center C (as shown in FIG. 5) of the main touch region A1 than the adjustment connection unit 20a.

It will be understood that in a case where the display panel 200 does not adopt a rounded corner design. For example, the display panel 200 adopts a right angle design, and then the position of the "reference point P" should be provided with a connection unit 20 according to the arrangement design principle of the touch structure 2 in the main touch region A1. Herein, the concept of "reference point P" is used to facilitate the description of the position of the adjustment connection unit 20a by describing the relative positional relationship of the reference point P and the adjustment connection unit 20a.

Therefore, the description "the reference point P is located outside the corner region A2, and the reference point P is located farther away from the center C of the main touch region A1 than the adjustment connection unit 20a" will be understood that, the connection unit 20 (which is removed because the display panel 200 adopts the rounded corner design), which should be disposed at the reference point P, is moved towards a direction proximate to the center C of the main touch region A1, so as to obtain the design position of the adjustment connection unit 20a.

In the touch structure 2 provided by the above embodiments of the present disclosure, a connection unit 20, which should be disposed at the reference point P, is moved towards the direction proximate to the center C of the main touch region A1, so as to obtain the design position of the adjustment connection unit 20a. That is, the corner region A2 is provided therein with the adjustment connection unit 20a, and touch electrodes electrically connected to the adjustment connection unit 20a, thereby increasing the facing area between some touch electrodes in the corner region A2, so as to increase mutual capacitance value between the some touch electrodes. As a result, and the touch performance of the display panel 200 in the corner region A2 is improved.

In some embodiments, as shown in FIG. 5, the plurality of first touch units 21 and the plurality of second touch units 22 intersect one another to constitute a plurality of capacitive units 23. The plurality of capacitive units 23 are arranged in a plurality of rows in the first direction X, and arranged in a plurality of columns in the second direction Y.

Referring to FIGS. 6A and 7A, each capacitive unit 23 includes a single connection unit 20, opposite portions of two first touch electrodes 210 connected to a first connection portion 211 of the single connection unit 20, and opposite portions of two second touch electrodes 220 connected to a second connection portion 221 of the single connection unit 20.

Referring to FIG. 7A, the capacitive unit 23 including the adjustment connection unit 20a is a compensation capacitive unit 230, the capacitive unit 23 located in a same row with and adjacent to the compensation capacitive unit 230 is a first capacitive unit 231, and the capacitive unit 23 located in a same column with and adjacent to the compensation capacitive unit 230 is a second capacitive unit 232; the compensation capacitive unit 230, the first capacitive unit 231 and the second capacitive unit 232 are all located in the corner region A2.

It will be understood that, referring to FIG. 6A, the first touch electrode 210 with a complete pattern (the first touch electrode 210 in the main touch region A1) includes two first sub-electrodes 210b that are arranged to be an integral structure; similarly, the second touch electrode 220 with a complete pattern (the second touch electrode 220 in the main touch region A1) also includes two second sub-electrodes 220b that are arranged to be an integral structure.

Therefore, in the main touch region A1, the opposite portions of the two first touch electrodes 210 connected to the first connection portion 211 in each capacitive unit 23 are two adjacent first sub-electrodes 210b connected to the first connection portion 211; similarly, the opposite portions of the two second touch electrodes 220 connected to the second connection portion 221 in each capacitive unit 23 are two adjacent second sub-electrodes 220b connected to the second connection portion 221.

Referring to FIGS. 5 and 7A, in the corner region A2, the two first touch electrodes 210 connected to the first connection portion 211 of the adjustment connection unit 20a are a first electrode E1 and a second electrode E2, respectively, and the first electrode E1 is located farther away from the center C of the main touch region A1 than the second electrode E2 in the first direction X. The two second touch electrodes 220 connected to the second connection portion 221 of the adjustment connection unit 20a are a third electrode E3 and a fourth electrode E4, respectively, and the third electrode E3 is located farther away from the center C of the main touch region A1 than the fourth electrode E4 in the second direction Y.

For example, as shown in FIGS. 7A and 7B, the first electrode E1, the second electrode E2, the third electrode E3, the fourth electrode E4, and the first connection portion 211 of the adjustment connection unit 20a are disposed in the first conductive layer 2a, and the second connection portion 221 of the adjustment connection unit 20a is disposed in the second conductive layer 2c. The first electrode E1 is directly electrically connected to the second electrode E2 through the first connection portion 211 in the first direction X. The second connection portion 221 is electrically connected to the third electrode E3 and the fourth electrode E4 through different via holes H in the insulating layer 2b in the second direction Y.

Alternatively, as shown in FIGS. 7C and 7D, the first electrode E1, the second electrode E2, the third electrode E3, the fourth electrode E4, and the second connection portion 221 of the adjustment connection unit 20a are disposed in the first conductive layer 2a, and the first connection portion 211 of the adjustment connection unit 20a is disposed in the second conductive layer 2c. In the second direction Y, the third electrode E3 is directly electrically connected to the fourth electrode E4 through the second connection portion 221. In the first direction X, the first connection portion 211 is electrically connected to the first electrode E1 and the second electrode E2 through different via holes H in the insulating layer 2b.

Compared with the touch electrode with the complete pattern in the main touch region A1, some touch electrodes in the corner region A2 and proximate to the edge of the corner region A2 do not each have a complete pattern. For example, none of the first electrode E1, the second electrode E2, the third electrode E3 and the fourth electrode E4 has the complete pattern. In this case, the opposite portions of the two first touch electrodes 210 connected to the first connection portion 211 of the adjustment connection unit 20a in the compensation capacitive unit 230 are the first electrode E1 and a portion of the second electrode E2 proximate to the first electrode E1; similarly, the opposite portions of the two second touch electrodes 220 connected to the second connection portion 221 of the adjustment connection unit 20a in the compensation capacitive unit 230 are the third electrode E3 and a portion of the fourth electrode E4 proximate to the third electrode E3 respectively.

As shown in FIG. 7A, an orthogonal projection of the adjustment connection unit 20a on the reference surface is within an orthogonal projection of the compensation capacitive unit 230 on the reference surface. The term "reference surface" may be referred in the above description.

It will be understood that, by using the design manner in which the orthogonal projection of the adjustment connection unit 20a on the reference surface is within the orthogonal projection of the compensation capacitive unit 230 on the reference surface, the facing area between the touch electrodes in the compensation capacitive unit 230 may be improved, so as to increase the mutual capacitance value of the compensation capacitive unit 230, which is beneficial to improving the touch performance of the display panel 200 in the corner region A2.

In some embodiments, as shown in FIG. 7A, an area of the first capacitive unit 231 is larger than an area of the compensation capacitive unit 230, and smaller than an area of a capacitive unit 23 located in the main touch region A1. An area of the second capacitive unit 232 is larger than the area of the compensation capacitive unit 230, and smaller than the area of the capacitive unit 23 located in the main touch region A1.

It will be understood that, since the display panel 200 adopts the rounded corner design, compared with the capacitive unit 23 located in the main touch region A1, the compensation capacitive unit 230, the first capacitive unit 231 and the second capacitive unit 232 are all located in the corner regions A2, and there is a pattern loss of each of some touch electrodes in each of the compensation capacitive unit 230, the first capacitive unit 231 and the second capacitive unit 232, and a pattern loss area of the touch electrode in the compensation capacitive unit 230 is large.

In some embodiments, as shown in FIG. 7A, the compensation capacitive unit 230 is divided by a third reference line L3 into a first capacitive sub-unit 230a and a second capacitive sub-unit 230b, and the first capacitive sub-unit 230a is closer to the first capacitive unit 231 than the second capacitive sub-unit 230b.

It will be noted that the third reference line L3 is a straight line extending through a center of the adjustment connection unit 20a and extending in the second direction Y.

A ratio of an area of the first capacitive sub-unit 230a and an area of the second capacitive sub-unit 230b is a first ratio; a ratio of a difference between the area of the first capacitive unit 231 and the area of the capacitive unit 23 located in the main touch region A1 and a difference between the area of the second capacitive unit 232 and the area of the capacitive unit 23 located in the main touch region A1 is a second ratio; the first ratio is substantially equal to the second ratio.

It will be understood that, the compensation capacitive unit 230 and the first capacitive unit 231 share the second electrode E2, and the first capacitive sub-unit 230a in the compensation capacitive unit 230 is located proximate to the first capacitive unit 231. In this way, since there is a pattern loss of the first capacitive unit 231 compared with the capacitive unit 23 in the main touch region A1, the mutual capacitance value of the first capacitive sub-unit 230a may be compensated for the first capacitive unit 231, so as to compensate the lost mutual capacitive value due to the pattern loss of the first capacitive unit 231.

Similarly, the compensation capacitive unit 230 and the second capacitive unit 232 share the fourth electrode E4, and the second capacitive sub-unit 230b in the compensation capacitive unit 230 is located proximate to the second capacitive unit 232. In this way, since there is a pattern loss of the second capacitive unit 232 compared with the capacitive units 23 in the main touch region A1, the mutual capacitance value of the second capacitive sub-unit 230b may be compensated for the second capacitive unit 232, so as to compensate the lost mutual capacitive value due to the pattern loss of the second capacitive unit 232.

In addition, the first ratio may be determined according to the second ratio. That is, according to the ratio of the difference between the area of the first capacitive unit 231 and the area of the capacitive unit 23 located in the main touch region A1 and the difference between the area of the second capacitive unit 232 and the area of the capacitive unit 23 located in the main touch region A1, the ratio of the area of the first capacitive sub-unit 230a and the area of the second capacitive sub-unit 230b is determined. For example, if the pattern loss of the first capacitive unit 231 is greater than the pattern loss of the second capacitive unit 232, the area of the first capacitive sub-unit 230a should be set to be larger than the area of the second capacitive sub-unit 230b.

Furthermore, in a case where the ratio of the area of the first capacitive sub-unit 230a to the area of the second capacitive sub-unit 230b is determined, the position of the adjustment connection unit 20a in the first direction X is determined.

In the embodiments of the present disclosure, the mutual capacitance value of the first capacitive sub-unit 230a may be compensated for the first capacitive unit 231, the mutual capacitance value of the second capacitive sub-unit 230b may be compensated for the second capacitive unit 232, so as to compensate the lost mutual capacitance value due to the pattern loss of the first capacitive unit 231 and the second capacitive unit 232, so that the touch performance of the display panel in the region in which the first capacitive unit 231 and the second capacitive unit 232 are located is improved. As a result, the touch performance of the display panel 200 in the corner region A2 is improved.

In some embodiments, as shown in FIG. 7A, a sum of the mutual capacitance value of the first capacitive unit 231, the mutual capacitance value of the second capacitive unit 232 and the mutual capacitance value of the compensation capacitive unit 230 is approximately twice the mutual capacitance values of the capacitive unit 23 in the main touch region A1.

It will be understood that, according to the above description, the mutual capacitance value of the first capacitive sub-unit 230a may be compensated for the first capacitive unit 231, so as to compensate the lost mutual capacitance value due to the pattern loss of the first capacitive unit 231; the mutual capacitance value, that has been compensated, of the first capacitive unit 231 should be substantially equal to the mutual capacitance value of the capacitive unit 23 in the main touch region A1.

Similarly, the mutual capacitance value of the second capacitive sub-unit 230b may be compensated for the second capacitive unit 232, so as to compensate the lost mutual capacitance value due to the pattern loss of the second capacitive unit 232; the mutual capacitance value, that has been compensated, of the second capacitive unit 232 should be substantially equal to the mutual capacitance value of the capacitive unit 23 in the main touch region A1.

Therefore, the sum of the mutual capacitance values of the first capacitive unit 231, the second capacitive unit 232 and the compensation capacitive unit 230 is approximately twice the mutual capacitance value of the capacitive unit 23 in the main touch region A1.

In some embodiments, as shown in FIG. 7A, the display panel 200 adopts a rounded corner design (that is, the edge of the display panel 200 in the corner region A2 is design to be curved), so that shapes of the compensation capacitive unit 230, the first capacitive unit 231 and the second capacitive unit 232 are each different from the shape of the capacitive unit 23 in the main touch region A1.

In some embodiments, as shown in FIG. 7A, an edge S1 of the first capacitive unit 231 away from the center C of the main touch region A1, an edge S2 of the compensation capacitive unit 230 away from the center C of the main touch region A1, and an edge S3 of the second capacitive unit 232 away from the center C of the main touch region A1 are sequentially connected to constitute a curved edge, and the curved edge is the edge of the corner region A2.

Figure 8:
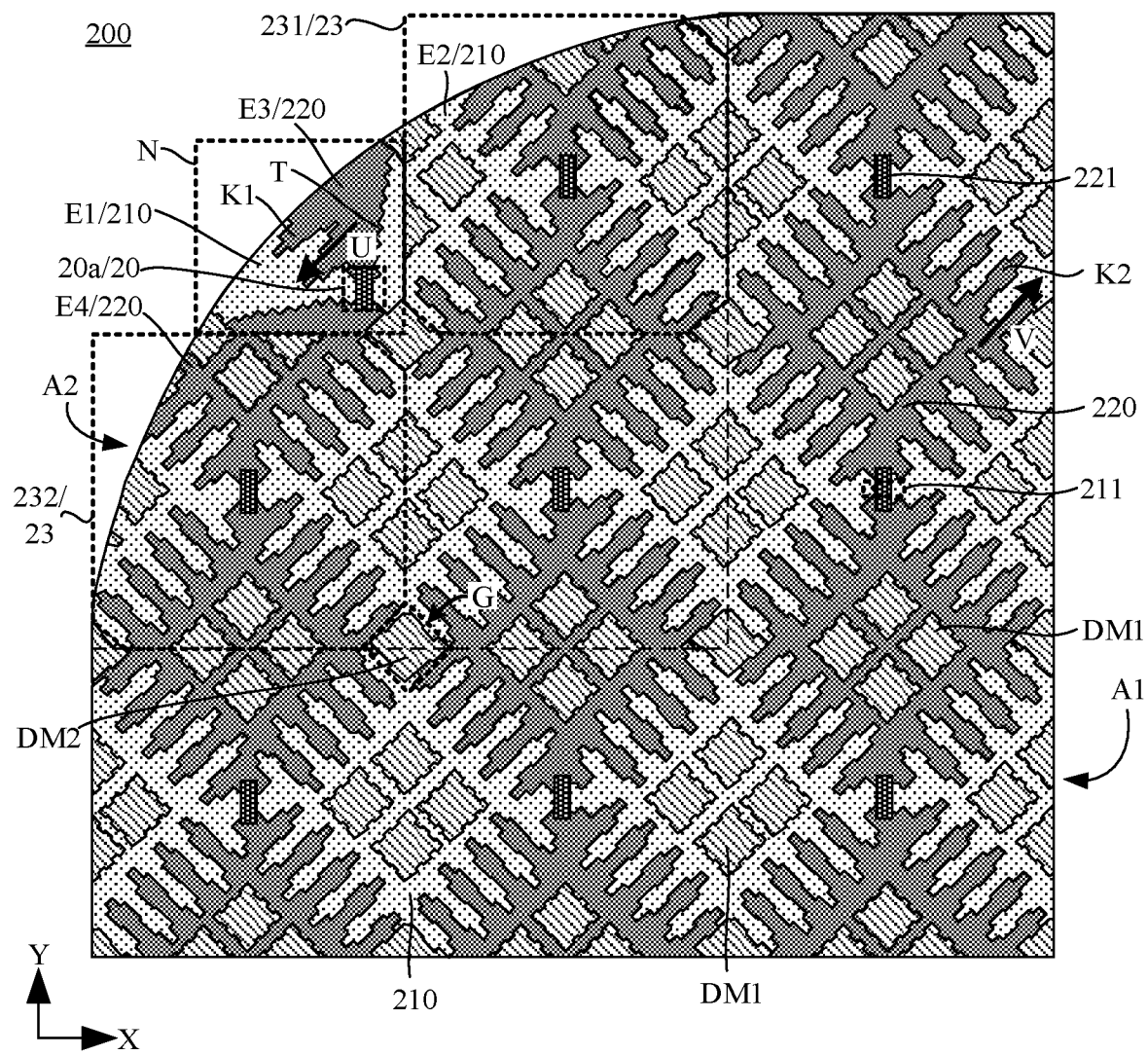
FIG. 8 is a partial top view of yet another display panel, in accordance with some embodiments.
Figure 9A:
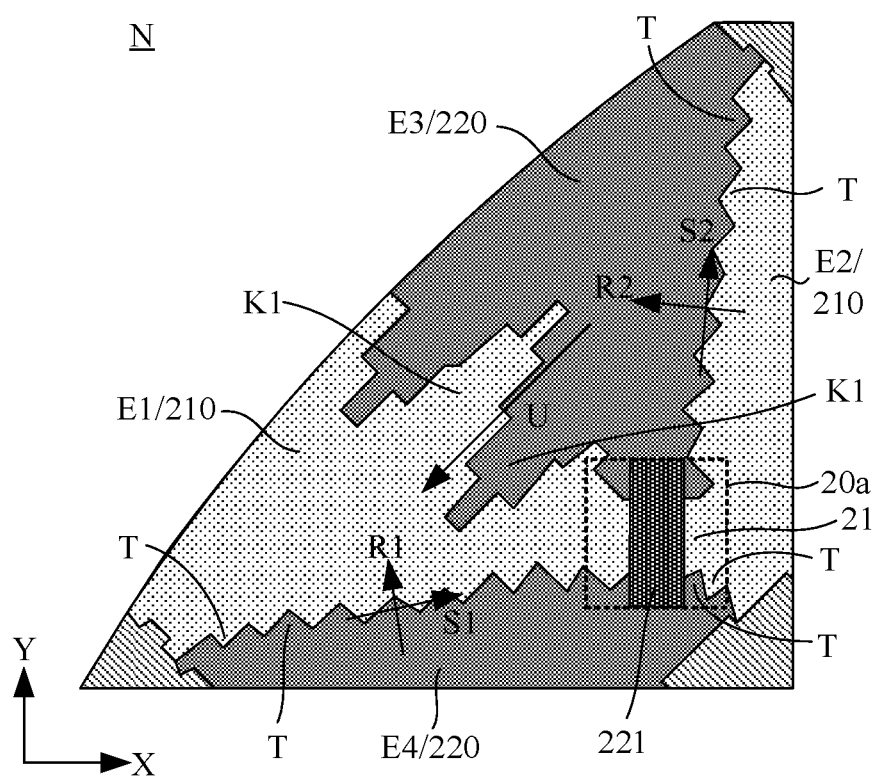
FIG. 9A is a partial enlargement view of the display panel in FIG. 8 in the region N.
Figure 9B:
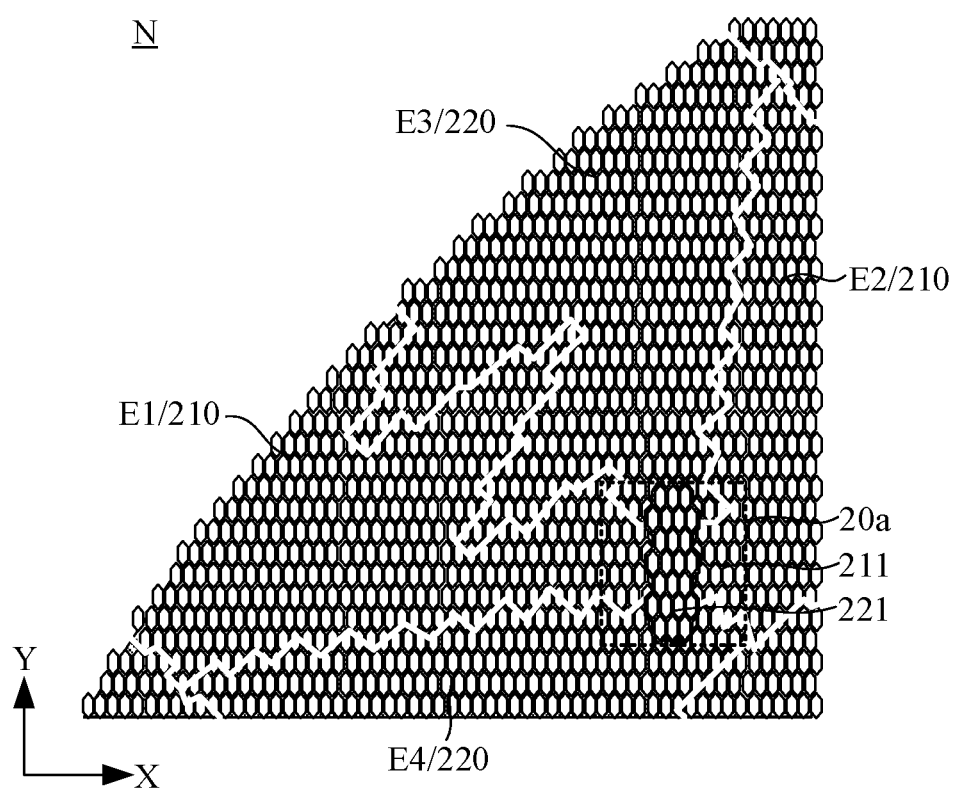
FIG. 9B is another partial enlarged view of the display panel in FIG. 8 in the region N.

FIG. 8 is a partial top view of a display panel, in accordance with some other embodiments; FIG. 9A is a partial enlargement view of the display panel in FIG. 8 in the region N; FIG. 9B is another partial enlarged view of the display panel in FIG. 8 in the region N.

Referring to FIGS. 5 and 8, two first touch electrodes 210 connected to the first connection portion 211 of the adjustment connection unit 20a are a first electrode E1 and a second electrode E2, respectively, and the first electrode E1 is located farther away from the center C of the main touch region A1 than the second electrode E2 in the first direction X. Two second touch electrodes 220 connected to the second connection portion 221 of the adjustment connection unit 20a are a third electrode E3 and a fourth electrode E4, respectively, and the third electrode E3 is located farther away from the center C of the main touch region A1 than the fourth electrode E4 in the second direction Y.

For example, referring to FIG. 8, an area of the second electrode E2 is larger than an area of the first electrode E1 and smaller than an area of the first touch electrode 210 in the main touch region A1. Moreover, an area of the fourth electrode E4 is larger than an area of the third electrode E3 and smaller than an area of the second touch electrode 220 in the main touch region A1.

Referring to FIG. 8, the shapes of the first electrode E1, the second electrode E2 and the first touch electrode 210 in the main touch region A1 are different from one another. In addition, the shapes of the third electrode E3, the fourth electrode E4, and the second touch electrode 220 in the main touch region A1 are different from one another.

Continue to refer to FIG. 8, shapes of contours, that are close to each other, of the first electrode E1 and the third electrode E3 are complementary, and shapes of contours, that are close to each other, of the first electrode E1 and the fourth electrode E4 are complementary, so that the facing area between the first electrode E1 and the third electrode E3 and the facing area between the first electrode E1 and the fourth electrode E4 may be increased, so as to increase the mutual capacitance value between the first electrode E1 and the third electrode E3, and the mutual capacitance value between the first electrode E1 and the fourth electrode E4.

Alternatively, referring to FIG. 8, shapes of contours, that are close to each other, of the second electrode E2 and the third electrode E3 are complementary, and shapes of contours, that are close to each other, of the second electrode E2 and the fourth electrode E4 are complementary, so that the facing area between the second electrode E2 and the third electrode E3 and the facing area between the second electrode E2 and the fourth electrode E4 may be increased, so as to increase the mutual capacitance value between the second electrode E2 and the third electrode E3, and the mutual capacitance value between the second electrode E2 and the fourth electrode E4.

Alternatively, referring to FIG. 8, shapes of contours, that are close to each other, of the first electrode E1 and the third electrode E3 are complementary, and shapes of contours, that are close to each other, of the first electrode E1 and the fourth electrode E4 are complementary; and shapes of contours, that are close to each other, of the second electrode E2 and the third electrode E3 are complementary, and shapes of contours, that are close to each other, of the second electrode E2 and the fourth electrode E4 are complementary. Thus, the facing area between the first electrode E1 and the third electrode E3, the facing area between the first electrode E1 and the fourth electrode E4, the facing area between the second electrode E2 and the third electrode E3, and the facing area between the second electrode E2 and the fourth electrode E4 may each be increased, so as to increase the mutual capacitance value between the first electrode E1 and the third electrode E3, the mutual capacitance value between the first electrode E1 and the fourth electrode E4, the mutual capacitance value between the second electrode E2 and the third electrode E3, and the mutual capacitance value between the second electrode E2 and the fourth electrode E4.

In some embodiments, as shown in FIG. 9A, the first touch electrode 210, the second touch electrode 220, the first connection portion 211 and the second connection portion 221 are each of a planar structure.

For example, the first connection portion 211 and the second connection portion 221 of the adjustment connection unit 20a, the first electrode E1, the second electrode E2, the third electrode E3 and the fourth electrode E4 are each of a planar structure.

In some embodiments, as shown in FIG. 9B, the first touch electrode 210, the second touch electrode 220, the first connection portion 211 and the second connection portion 221 are each of a metal mesh structure. The metal mesh structure with a small resistance and a high sensitivity may improve the touch performance of the display panel 200. In addition, the metal mesh structure has the high mechanical strength and a light weight, which is beneficial to reducing the weight of the display panel 200.

For example, the first connection portion 211 and the second connection portion 221 of the adjustment connection unit 20a, the first electrode E1, the second electrode E2, the third electrode E3, and the fourth electrode E4 are each of a metal mesh structure.

In some embodiments, as shown in FIGS. 8 and 9A, the edges of the first electrode E1 and the third electrode E3 each have at least one first branch K1. For example, the edge of the first electrode E1 proximate to the third electrode E3 has at least one first branch K1, and the edge of the third electrode E3 proximate to the first electrode E1 has at least one first branch K1.

At least one first branch K1 of the first electrode E1 extends into the third electrode E3, and at least one first branch K1 of the third electrode E3 extends into the first electrode E1.

For example, as shown in FIGS. 8 and 9A, the first branch K1 is in a shape of a long strip.

With the above arrangement manner in which the first branch K1 of the first electrode E1 extends into the third electrode E3, and the first branch K1 of the third electrode E3 extends into the first electrode E1, the facing area between the first electrode E1 and the third electrode E3 may be further increased, thereby increasing the mutual capacitance value between the first electrode E1 and the third electrode E3.

It will be noted that, referring to FIG. 8, the edge of the touch electrode (the first touch electrode 210 and/or the second touch electrode 220) in the main touch region A1 has at least one second branch K2, and the second branch K2 also extends into the touch electrode adjacent thereto, so that the facing area between the touch electrode and the adjacent touch electrode is increased, and the mutual capacitance value between the two is increased.

Moreover, compared with the main touch region A1, the region in which the adjustment connection unit 20a is located has a small layout space. Therefore, a height of the first branch K1 (a size of the first branch K1 in an extension direction U) of the touch electrode connected to the connection unit 20a is set to be smaller than a height of the second branch K2 (a size of the second branch K2 in an extension direction V) of the touch electrode located in the main touch region A1. In this way, it may be possible to provide more first branches K1 in a limited layout space, so as to increase the facing area between the touch electrodes connected to the adjustment connection unit 20a, so that the mutual capacitance value between the touch electrodes connected to the connection unit 20a is increased.

In some embodiments, as shown in FIG. 9A, edges of the first electrode E1 and the fourth electrode E4 each have at least one protrusion T. For example, the edge of the first electrode E1 proximate to the fourth electrode E4 has at least one protrusion T, and the edge of the fourth electrode E4 proximate to the first electrode E1 has at least one protrusion T. A shape of the at least one protrusion of the first electrode E1 matches a shape of the at least one protrusion of the fourth electrode E4. That is, a shape of a contour of the protrusion T of the first electrode E1 matches a shape of a contour of the protrusion T of the fourth electrode E4.

Continue to refer to FIG. 9A, edges of the second electrode E2 and the third electrode E3 each have at least one protrusion T. For example, the edge of the third electrode E3 proximate to the second electrode E2 has at least one protrusion T, and the edge of the second electrode E2 proximate to the third electrode E3 has at least one protrusion T. A shape of the at least one protrusion of the second electrode E2 matches a shape of the at least one protrusion of the third electrode E3. That is, a shape of a contour of the protrusion T of the second electrode E2 matches a shape of a contour of the protrusion T of the third electrode E3.

For example, the shape(s) of the protrusion(s) T may include at least one of a triangle, a rectangle, a trapezoid, a circle, and an ellipse. For example, the shape of the protrusion T shown in FIG. 9A is a triangle. That is, the edge of the first electrode E1 proximate to the fourth electrode E4 is in a shape of a zigzag, the edge of the fourth electrode E4 proximate to the first electrode E1 is in a shape of a zigzag, the edge of the third electrode E3 proximate to the second electrode E2 is in a shape of a zigzag, and the edge of the second electrode E2 proximate to the third electrode E3 is in a shape of a zigzag.

It will be noted that, referring to FIG. 9A, the first branch K1 of the first electrode E1 extends into the third electrode E3, and the first branch K1 of the third electrode E3 extends into the first electrode E1, so that the edge of the first electrode E1 proximate to the fourth electrode E4, the edge of the fourth electrode E4 proximate to the first electrode E1, the edge of the third electrode E3 proximate to the second electrode E2, and the edge of the second electrode E2 proximate to the third electrode E3 each do not have a layout space of the first branch K1.

Therefore, at least one protrusion T may be disposed on the edge of the first electrode E1 proximate to the fourth electrode E4, at least one protrusion T may be disposed on the edge of the fourth electrode E4 proximate to the first electrode E1, and a height of the protrusion T (a size of the protrusion T in a designated direction R1; the edges of the first electrode E1 and the fourth electrode E4 each extending in a direction S1, and the designated direction R1 being perpendicular to the direction S1) is smaller than a height of the first branch K1, so that it is possible to provide more protrusions T in the limited layout space. As a result, the facing area between the first electrode E1 and the fourth electrode E4 is improved, thereby improving the mutual capacitance value between the first electrode E1 and the fourth electrode E4.

Similarly, at least one protrusion T may be disposed on the edge of the third electrode E3 proximate to the second electrode E2, at least one protrusion T may be disposed on the edge of the second electrode E2 proximate to the third electrode E3, and a height of the protrusion T (a size of the protrusion T in a designated direction R2; the edges of the second electrode E2 and the third electrode E3 each extending in a direction S2, and the designated direction R2 being perpendicular to the direction S2) is smaller than the height of the first branch K1, so that it is possible to provide more protrusions T in the limited layout space. As a result, the facing area between the second electrode E2 and the third electrode E3 is improved, so that the mutual capacitance value between the second electrode E2 and the third electrode E3 is improved.

In some embodiments, as shown in FIG. 9A, the edges of the second electrode E2 and the fourth electrode E4 have at least one protrusion T. For example, the edge of the second electrode E2 proximate to the fourth electrode E4 has at least one protrusion T, and the edge of the fourth electrode E4 proximate to the second electrode E2 has at least one protrusion T. A shape of the at least one protrusion of the second electrode E2 matches a shape of the at least one protrusion of the fourth electrode E4. That is, a shape of a contour of the protrusion T of the second electrode E2 and a shape of a contour of the protrusion T of the fourth electrode E4 are complementary.

It will be understood that, referring to FIG. 9A, the edge of the second electrode E2 proximate to the fourth electrode E4, and the edge of the fourth electrode E4 proximate to the second electrode E2 each have a short length and a small layout space. In this case, at least one protrusion T may be disposed on the edge of the second electrode E2 proximate to the fourth electrode E4, and at least one protrusion T may be disposed on the edge of the fourth electrode E4 proximate to the second electrode E2, so that the facing area between the second electrode E2 and the fourth electrode E4 is increased. As a result, the mutual capacitance value between the second electrode E2 and the fourth electrode E4 is improved.

Figure 10:
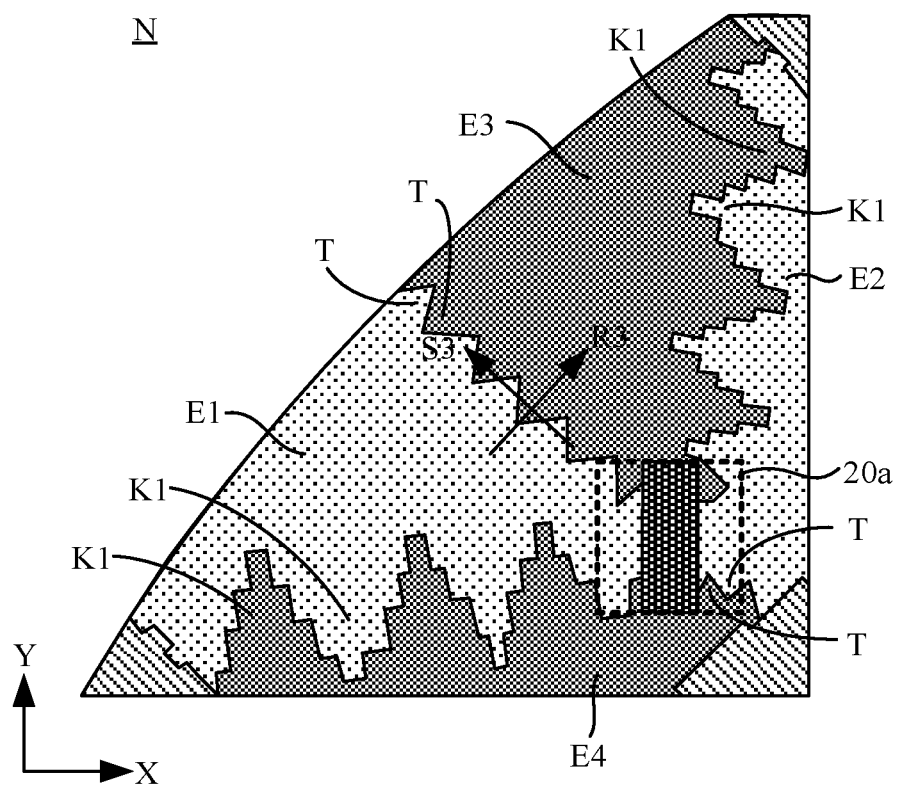
FIG. 10 is a partial enlargement view of the display panel in FIG. 8 in the region N, in accordance with some other embodiments.

FIG. 10 is a partial enlargement view of the display panel in FIG. 8 in the region N, in accordance with some other embodiments.

Referring to FIG. 10, the edges of the first electrode E1 and the fourth electrode E4 each have at least one first branch K1. For example, the edge of the first electrode E1 proximate to the fourth electrode E4 has at least one first branch K1, and the edge of the fourth electrode E4 proximate to the first electrode E1 has at least one first branch K1.

The at least one first branch K1 of the first electrode E1 extends into the fourth electrode E4, and the at least one first branch K1 of the fourth electrode E4 extends into the first electrode E1.

With the above arrangement manner in which the first branch K1 of the first electrode E1 extends into the fourth electrode E4, and the first branch K1 of the fourth electrode E4 extends into the first electrode E1, the facing area between the first electrode E1 and the fourth electrode E4 is further increased, thereby improving the mutual capacitance value between the first electrode E1 and the fourth electrode E4.

Continue to refer to FIG. 10, the edges of the second electrode E2 and the third electrode E3 each have at least one first branch K1. For example, the edge of the second electrode E2 proximate to the third electrode E3 has at least one first branch K1, and the edge of the third electrode E3 proximate to the second electrode E2 has at least one first branch K1.

The at least one first branch K1 of the second electrode E2 extends into the third electrode, and the at least one first branch K1 of the third electrode E3 extends into the second electrode E2.

With the above arrangement manner in which the first branch K1 of the third electrode E3 extends into the second electrode E2, and the first branch K1 of the second electrode E2 extends into the third electrode E3, the facing area between the second electrode E2 and the third electrode E3 is further improved, thereby improving the mutual capacitance value between the second electrode E2 and the third electrode E3.

For example, as shown in FIG. 10, the first branch K1 is in a shape of a long strip.

In some embodiments, as shown in FIG. 10, the edges of the first electrode E1 and the third electrode E3 each have at least one protrusion T. For example, the edge of the first electrode E1 proximate to the third electrode E3 has at least one protrusion T, and the edge of the third electrode E3 proximate to the first electrode E1 has at least one protrusion T. A shape of the at least one protrusion of the first electrode E1 matches a shape of the at least one protrusion of the third electrode E3. That is, a shape of a contour of the protrusion T of the first electrode E1 and a shape of a contour of the protrusion T of the third electrode E3 are complementary.

For example, the shape(s) of the protrusion(s) T may include at least one of a triangle, a rectangle, a trapezoid, a circle, and an ellipse. For example, the shape of the protrusion T shown in FIG. 10 is a triangle. That is, the edge of the first electrode E1 proximate to the third electrode E3 is in a shape of a zigzag, the edge of the third electrode E3 proximate to the first electrode E1 is in a shape of a zigzag.

It will be noted that, referring to FIG. 10, the first branch K1 of the first electrode E1 extends into the fourth electrode E4, the first branch K1 of the fourth electrode E4 extends into the first electrode E1, the first branch K1 of the third electrode E3 extends into the second electrode E2, and the first branch K1 of the second electrode E2 extends into the third electrode E3. Thus, the edge of the first electrode E1 proximate to the third electrode E3, and the edge of the third electrode E3 proximate to the first electrode E1 each do not have the layout space of the first branch K1.

Therefore, at least one protrusion T may be disposed on the edge of the first electrode E1 proximate to the third electrode E3, at least one protrusion T can be disposed on the edge of the third electrode E3 proximate to the first electrode E1, and a height of the protrusion T (a size of the protrusion T in a designated direction R3; the edges of the first electrode E1 and the third electrode E3 each extending in a direction S3, and the designated direction R3 being perpendicular to the direction S3) is smaller than a height of the first branch K1, so that it is possible to provide more protrusions T in the limited layout space. As a result, the facing area between the first electrode E1 and the third electrode E3 is improved, thereby improving the mutual capacitance value between the first electrode E1 and the third electrode E3.

In some embodiments, as shown in FIG. 10, the edges of the second electrode E2 and the fourth electrode E4 each have at least one protrusion T. For example, the edge of the second electrode E2 proximate to the fourth electrode E4 has at least one protrusion T, and the edge of the fourth electrode E4 proximate to the second electrode E2 has at least one protrusion T. A shape of the at least one protrusion of the second electrode E2 matches a shape of the at least one protrusion of the fourth electrode E4. That is, a shape of a contour of the protrusion T of the second electrode E2 and a shape of a contour of the protrusion T of the fourth electrode E4 are complementary.

It will be understood that, referring to FIG. 10, the edge of the second electrode E2 proximate to the fourth electrode E4, and the edge of the fourth electrode E4 proximate to the second electrode E2 each have a short length and a small layout space. In this case, at least one protrusion T may be disposed on the edge of the second electrode E2 proximate to the fourth electrode E4, and at least one protrusion T can be disposed on the edge of the fourth electrode E4 proximate to the second electrode E2, so that the facing area between the second electrode E2 and the fourth electrode E4 is increased. As a result, the mutual capacitance value between the second electrode E2 and the fourth electrode E4 is improved.

Figure 11:
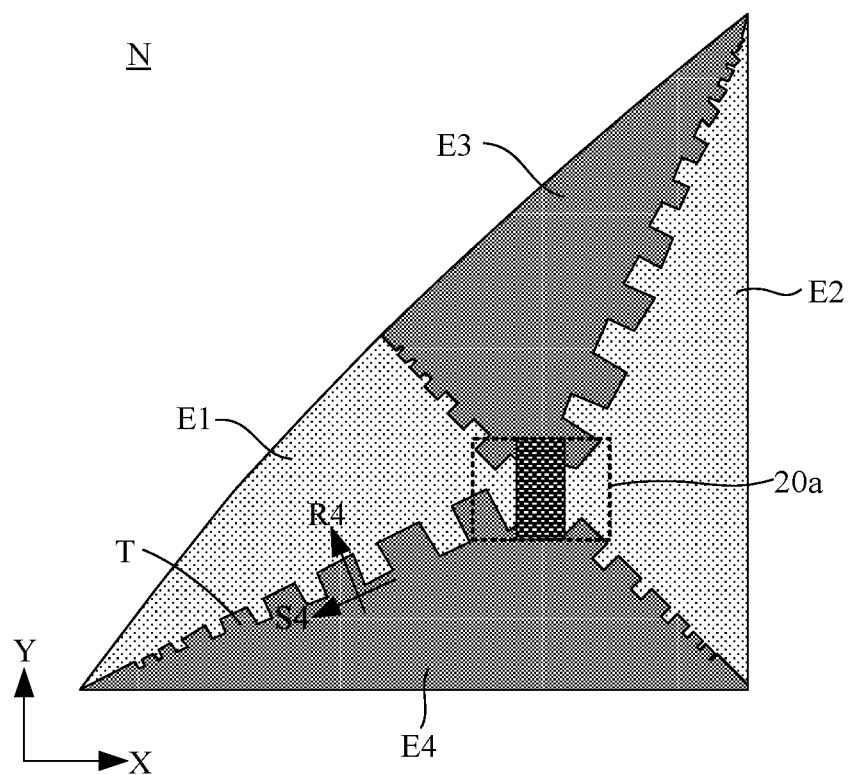
FIG. 11 is a partial enlargement view of the display panel in FIG. 8 in the region N, in accordance with some other embodiments.

FIG. 11 is a partial enlargement view of the display panel in FIG. 8 in the region N, in accordance with some other embodiments.

Referring to FIG. 11, the edges of the first electrode E1, the second electrode E2, the third electrode E3 and the fourth electrode E4 each have at least one protrusion T. For example, the edge of the first electrode E1 proximate to the third electrode E3 has at least one protrusion T, and the edge of the first electrode E1 proximate to the fourth electrode E4 has at least one protrusion T; the edge of the second electrode E2 proximate to the third electrode E3 has at least one protrusion T, and the edge of the second electrode E2 proximate to the fourth electrode E4 has at least one protrusion T; the edge of the third electrode E3 proximate to the first electrode E1 has at least one protrusion T, and the edge of the third electrode E3 proximate to the second electrode E2 has at least one protrusion T; the edge of the fourth electrode E4 proximate to the first electrode E1 has at least one protrusion T, and the edge of the fourth electrode E4 proximate to the second electrode E2 has at least one protrusion T.

A shape of the at least one protrusion of the first electrode E1 matches a shape of the at least one protrusion of the third electrode E3 and a shape of the at least one protrusion of the fourth electrode E4. That is, a shape of a contour of the protrusion T of the first electrode E1 and a shape of a contour of the protrusion T of the third electrode E3 are complementary, a shape of a contour of the protrusion T of the first electrode E1 and a shape of a contour of the protrusion T of the fourth electrode E4 are complementary.

A shape of the at least one protrusion of the second electrode E2 matches a shape of the at least one protrusion of the third electrode E3 and a shape of the at least one protrusion of the fourth electrode E4. That is, a shape of a contour of the protrusion T of the second electrode E2 and a shape of a contour of the protrusion T of the third electrode E3 are complementary, a shape of a contour of the protrusion T of the second electrode E2 and a shape of a contour of the protrusion T of the fourth electrode E4 are complementary.

For example, the shape(s) of the protrusion(s) T may include at least one of a triangle, a rectangle, a trapezoid, a circle, and an ellipse. For example, the shape of the protrusion T shown in FIG. 11 is rectangular.

It will be understood that, referring to FIG. 8, compared with the main touch region A1, the region in which the adjustment connection unit 20a is located has a small layout space. Therefore, in conjunction with FIGS. 8 and 11, the edges of the touch electrodes connected to the adjustment connection unit 20a each have protrusion(s) T, and the height of the protrusion T is smaller than the height of the second branch K2 of the touch electrode located in the main touch region A1. Considering the first electrode E1 and the fourth electrode E4 as an example, the height of the protrusion T is a size of the protrusion T in a designated direction R4; the edges of the first electrode E1 and the fourth electrode E4 each extend in a direction S4, and the designated direction R4 is perpendicular to the direction S4. In addition, in the direction S4, the height of the protrusion T of the edge of the first electrode E1 proximate to the fourth electrode E4 is gradually decreased, and the height of the protrusion T of the edge of the fourth electrode E4 proximate to the first electrode E1 is gradually decreased.

In this way, it may be possible to provide more protrusions T in the limited layout space, so as to increase the facing area between the touch electrodes connected to the adjustment connection unit 20a, so that the mutual capacitance value between the touch electrodes connected to the connection unit 20a is increased.

In some embodiments, as shown in FIG. 8, at least one first touch electrode 210 of the plurality of first touch electrodes is provided therein with at least one first dummy electrode DM1, and a first dummy electrode DM1 is disconnected from a respective first touch electrode 210.

It will be noted that, an orthogonal projection of the first dummy electrode DM1 on the reference surface is within an orthogonal projection of the respective first touch electrode 210 on the reference surface. Moreover, there is a gap between the first dummy electrode DM1 and the first touch electrode 210, so as to ensure that the first dummy electrode DM1 is disconnected from the first touch electrode 210, so that the first dummy electrode DM1 is insulated from the first touch electrode 210.

In addition, in a case where an electrical signal is transmitted on the first touch electrode 210, a capacitance may be created between the first touch electrode 210 and a conductive layer (e.g., the cathode L3) in the display substrate 1, which increases the transmission load of the electrical signal on the first touch electrode 210, so that the power consumption of the display panel 200 is increased.

In the above embodiments of the present disclosure, the first dummy electrode DM1 is disposed in the first touch electrode 210, so that the facing area of the first touch electrode 210 and the conductive layer in the display substrate 1 may be reduced. As a result, the capacitance value generated between the first touch electrode 210 and the conductive layer on the display substrate 1 is reduced, thereby reducing the transmission load of the electrical signal on the first touch electrode 210 to reduce the power consumption of the display panel 200.

For example, as shown in FIG. 8, four first dummy electrodes DM1 are disposed in the first touch electrode 210 located in the main touch region A1. In the first touch electrodes 210 of the corner region A2, the first electrode E1 is provided therein with no first dummy electrode DM1; except for the first electrode E1, each of a part of first touch electrodes 210 is provided therein with two first dummy electrodes DM1, and each of another part of the first touch electrodes 210 is provided therein with three first dummy electrodes DM1, and each of yet another part of the first touch electrodes 210 is provided therein with four first dummy electrodes DM1.

In some embodiments, as shown in FIG. 8, at least one second touch electrode 220 of the plurality of second touch electrodes is provided therein with at least one first dummy electrode DM1, and a first dummy electrode DM1 is disconnected from a respective second touch electrode 220.

It will be noted that, an orthogonal projection of the first dummy electrode DM1 on the reference surface is within an orthogonal projection of the respective second touch electrode 220 on the reference surface. Moreover, there is a gap between the first dummy electrode DM1 and the second touch electrode 220, so as to ensure that the first dummy electrode DM1 is disconnected from the second touch electrode 220, so that the first dummy electrode DM1 is insulated from the second touch electrode 220.

In addition, in a case where an electrical signal is transmitted on the second touch electrode 220, a capacitance may be created between the second touch electrode 220 and a conductive layer (e.g., the cathode L3) in the display substrate 1, which increases the transmission load of the electrical signal on the second touch electrode 220, so that the power consumption of the display panel 200 is increased.

In the above embodiments of the present disclosure, the second touch electrode 220 is provided therein with the first dummy electrode DM1, so that the facing area of the second touch electrode 220 and the conductive layer in the display substrate 1 may be reduced. As a result, the capacitance value generated between the second touch electrode 220 and the conductive layer on the display substrate 1 is reduced, thereby reducing the transmission load of the electrical signal on the second touch electrode 220 to reduce the power consumption of the display panel 200.

For example, as shown in FIG. 8, four first dummy electrodes DM1 are disposed in the second touch electrode 220 located in the main touch region A1. In the second touch electrodes 220 of the corner region A2, no first dummy electrode DM1 is disposed in the third electrode E3; except for the third electrode E3, each of a part of second touch electrodes 220 is provided therein with two first dummy electrodes DM1, and each of another part of the second touch electrodes 220 is provided therein with three first dummy electrodes DM1, and each of yet another part of the second touch electrodes 220 is provided therein with four first dummy electrodes DM1.

In some embodiments, as shown in FIG. 8, at least one first touch electrode 210 of the plurality of first touch electrodes is provided therein with at least one first dummy electrode DM1, and a first dummy electrode DM1 is disconnected from a respective first touch electrode 210. Moreover, at least one second touch electrode 220 of the plurality of second touch electrodes is provided therein with at least one first dummy electrode DM1, and a first dummy electrode DM1 is disconnected from a respective second touch electrode 220.

In the above embodiments of the present disclosure, the first touch electrode 210 and the second touch electrode 220 are each provided therein with the first dummy electrode DM1, so that the facing area of the first touch electrode 210 and the conductive layer in the display substrate 1, and the facing area of the second touch electrode 220 and the conductive layer in the display substrate 1 may be reduced. As a result, the capacitance value generated between the first touch electrode 210 and the conductive layer in the display substrate 1, and the capacitance value generated between the second touch electrode 220 and the conductive layer in the display substrate 1 are each reduced, thereby reducing the transmission load of the electrical signal on the first touch electrode 210 and the second touch electrode 220 to reduce the power consumption of the display panel 200.

In some embodiments, as shown in FIG. 8, an area of a first dummy electrode DM1 in a touch electrode (a first touch electrode or a second touch electrode) in the corner region A2 is smaller than or equal to an area of another first dummy electrode DM1 in a touch electrode (a first touch electrode or a second touch electrode) in the main touch region A1.

It will be understood that, the design area of the first dummy electrode DM1 in the touch electrode should be positively correlated to the area of the touch electrode. That is, the larger the area of the touch electrode, the larger the design area of the first dummy electrode DM1 in the touch electrode.

Therefore, since the area of the touch electrode in the corner region A2 is less than or equal to the area of the touch electrode in the main touch region A1, the design area of the first dummy electrode DM1 of the touch electrode in the corner region A2 should be less than or equal to the design area of the first dummy electrode DM1 of the touch electrode in the main touch region A1 accordingly.

In some embodiments, as shown in FIG. 8, the touch structure 2 further includes a second dummy electrode DM2, and the second dummy electrode DM2 is disposed in a gap region G between capacitive units 23 that are adjacent to one another.

It will be noted that, the transmittance of the second dummy electrode DM2 is close to that of the touch electrode (the first touch electrode 210 or the second touch electrode 220). In this way, the second dummy electrode DM2 is disposed in the gap region G between the capacitive units 23, it may be possible to ensure that each region of the touch structure 2 has a coincident light transmission rate, so as to prevent the light transmission rate of the display panel 200 in the gap region G from being too large, which is beneficial to improving a brightness uniformity of all regions of the display panel 200.

In some embodiments, as shown in FIG. 5, the display panel 200 further has a first peripheral region BB1 and a second peripheral region BB2 that are located on opposite sides of the main touch region A1 in the first direction X, and a third peripheral region BB3 and a fourth peripheral region BB4 that are located on opposite sides of the main touch region A1 in the second direction Y.

As shown in FIGS. 5 and 7A, the touch structure 2 further includes a plurality of first touch lines 31 and a plurality of second touch lines 32, the plurality of first touch lines 31 each extend from the first peripheral region BB1 to the fourth peripheral region BB4, and at least one first touch line 31 is electrically connected to a single first touch unit 21. The plurality of second touch lines 32 each extend from the third peripheral region BB3 to the fourth peripheral region BB4 via the second peripheral region BB2, and at least one second touch line 32 is electrically connected to a single second touch unit 22.

For example, as shown in FIGS. 5 and 7A, a single first touch line 31 is electrically connected to a single first touch unit 21, and a single second touch line 32 is electrically connected to a single second touch unit 22.

At least one first touch line 31 is electrically connected to the first electrode E1, and at least one second touch line 32 is electrically connected to the third electrode E3.

For example, as shown in FIG. 7A, a single first touch line 31 is electrically connected to the first electrode E1, and a single second touch line 32 is electrically connected to the third electrode E3.

As shown in FIGS. 5 and 7A, an orthogonal projection of the at least one first touch line 31 on the reference surface is non-overlapping with an orthogonal projection of the at least one second touch line 32 on the reference surface.

For example, the orthogonal projections of all the first touch lines 31 on the reference surface are each non-overlapping with the orthogonal projections of all the second touch lines 32 on the reference surface.

With the layout design described above, the orthogonal projection(s) of the first touch line(s) 31 on the reference surface are each non-overlapping with the orthogonal projection(s) of the second touch line(s) 32 on the reference surface, the first touch line 31 and the second touch line 32 may be made of a same material and disposed in a same layer, so as to ensure an integrity and continuity of the first touch line(s) 31 and the second touch line(s) 32, thereby reducing a breakage risk of the first touch line(s) 31 and the second touch line(s) 32.

It will be noted that, the term "same layer" mentioned herein refers to a layer structure formed through a same patterning process using a same mask in which a film layer for forming specific patterns is formed by using a same film-forming process.

Depending on different specific patterns, the same patterning process may include exposure, development and etching, and the specific patterns formed in the layer structure may be continuous or discontinuous, and these specific patterns may also be at different heights or have different thicknesses.

It will be understood that, referring to FIG. 7A, a portion of the display panel 200 proximate to the corner region A2 is easily to be eroded by moisture and oxygen. By using the layout design described above, one of the first touch line 31 and the second touch line 32 does not need to cross the other one thereof, so as to avoid a layout design of the first touch line 31 crossing the second touch line 32, which may reduce the breakage risk of the touch line due to the erosion caused by the moisture and oxygen attack.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch structure having a touch region, the touch region including a main touch region and a corner region, the corner region being located on a periphery of the main touch region;

the touch structure comprising:
a plurality of first touch units extending in a first direction, wherein a first touch unit includes a plurality of first touch electrodes and a plurality of first connection portions, a first connection portion is electrically connected to two adjacent first touch electrodes;
a plurality of second touch units extending in a second direction, wherein a second touch unit includes a plurality of second touch electrodes and a plurality of second connection portions, a second connection portion is electrically connected to two adjacent second touch electrodes; the first direction intersects the second direction;
wherein an orthogonal projection of the first connection portion on a reference surface intersects an orthogonal projection of the second connection portion on the reference surface, the first connection portion and the second connection portion, whose orthogonal projections on the reference surface intersect each other, constitute a connection unit; at least one of a plurality of connection units composed of the plurality of first connection portions and the plurality of second connection portions is an adjustment connection unit, and the adjustment connection unit is located in the corner region;
in a first touch unit in which a first connection portion of the adjustment connection unit is located, a straight line passing through centers of at least two first touch electrodes located in the main touch region is a first reference line; in a second touch unit in which a second connection portion of the adjustment connection unit is located, a straight line passing through centers of at least two second touch electrodes located in the main touch region is a second reference line; an intersection point of the first reference line and the second reference line is a reference point; and the reference point is located outside the corner region, and is located farther away from a center of the main touch region than the adjustment connection unit;

wherein two first touch electrodes connected to the first connection portion of the adjustment connection unit are respectively a first electrode and a second electrode, and the first electrode is located farther away from the center of the main touch region than the second electrode in the first direction;

two second touch electrodes connected to the second connection portion of the adjustment connection unit are respectively a third electrode and a fourth electrode, and the third electrode is located farther away from the center of the main touch region than the fourth electrode in the second direction; and shapes of contours, that are close to each other, of the first electrode and the third electrode are complementary, and shapes of contours, that are close to each other, of the first electrode and the fourth electrode are complementary; and/or, shapes of contours, that are close to each other, of the second electrode and the third electrode are complementary, and shapes of contours, that are close to each other, of the second electrode and the fourth electrode are complementary.

2. The touch structure according to claim 1, wherein the plurality of first touch units and the plurality of second touch units intersect one another to constitute a plurality of capacitive units; the plurality of capacitive units are arranged in a plurality of rows in the first direction, and arranged in a plurality of columns in the second direction;

a capacitive unit includes a single connection unit, opposite portions of two first touch electrodes connected to a first connection portion of the single connection unit, and opposite portions of two second touch electrodes connected to a second connection portion of the single connection unit;

a capacitive unit including the adjustment connection unit is a compensation capacitive unit, a capacitive unit located in a same row with and adjacent to the compensation capacitive unit is a first capacitive unit, a main capacitive unit located in a same column with and adjacent to the compensation capacitive unit is a second capacitive unit; and the compensation capacitive unit, the first capacitive unit and the second capacitive unit are all located in the corner region.

3. The touch structure according to claim 2, wherein an area of the first capacitive unit and an area of the second capacitive unit are each larger than an area of the compensation capacitive unit, and are each smaller than an area of a capacitive unit located in the main touch region.

4. The touch structure according to claim 2, wherein the compensation capacitive unit is divided by a third reference line into a first capacitive sub-unit and a second capacitive sub-unit; the third reference line is a straight line extending through a center of the adjustment connection unit and extending in the second direction; the first capacitive sub-unit is closer to the first capacitive unit than the second capacitive sub-unit; a ratio of an area of the first capacitive sub-unit and an area of the second capacitive sub-unit is a first ratio; a ratio of a difference between an area of the first capacitive unit and an area of a capacitive unit located in the main touch region and a difference between an area of the second capacitive unit and the area of the capacitive unit located in the main touch region is a second ratio; the first ratio is substantially equal to the second ratio; and/or a sum of a mutual capacitance value of the first capacitive unit, a mutual capacitance value of the second capacitive unit and a mutual capacitance value of the compensation capacitive unit is approximately twice a mutual capacitance value of a capacitive unit located in the main touch region; and/or shapes of the compensation capacitive unit, the first capacitive unit and the second capacitive unit are each different from a shape of a capacitive unit located in the main touch region.

5. The touch structure according to claim 1, wherein edges of the first electrode and the third electrode each have at least one first branch, the at least one first branch of the first electrode extends into the third electrode, and the at least one first branch of the third electrode extends into the first electrode.

6. The touch structure according to claim 5, wherein edges of the first electrode and the fourth electrode each have at least one protrusion, and a shape of the at least one protrusion of the first electrode matches a shape of the at least one protrusion of the fourth electrode; and edges of the second electrode and the third electrode each have at least one protrusion, and a shape of the at least one protrusion of the second electrode matches a shape of the at least one protrusion of the third electrode; and/or edges of the second electrode and the fourth electrode each have at least one protrusion, and a shape of the at least one protrusion of the second electrode matches a shape of the at least one protrusion of the fourth electrode.

7. The touch structure according to claim 1, wherein edges of the first electrode and the fourth electrode each have at least one first branch, the at least one first branch of the first electrode extends into the fourth electrode, and the at least one first branch of the fourth electrode extends into the first electrode; and edges of the second electrode and the third electrode each have at least one first branch, the at least one first branch of the second electrode extends into the third electrode, and the at least one first branch of the third electrode extends into the second electrode.

8. The touch structure according to claim 7, wherein the edges of the first electrode and the third electrode each have at least one protrusion, and a shape of the at least one protrusion of the first electrode matches a shape of the at least one protrusion of the third electrode; and/or edges of the second electrode and the fourth electrode each have at least one protrusion, and a shape of the at least one protrusion of the second electrode matches a shape of the at least one protrusion of the fourth electrode.

9. The touch structure according to claim 8, wherein a shape of a protrusion includes a triangle, a rectangle, a trapezoid, a circle, or an ellipse; and/or a height of a first branch is greater than a height of a protrusion.

10. The touch structure according to claim 5, wherein an edge of a first touch electrode and/or a second touch electrode located in the main touch region has at least one second branch; a height of a second branch is greater than a height of a first branch; and/or a first branch is in a shape of a long strip.

11. The touch structure according to claim 1, wherein edges of the first electrode, the second electrode, the third electrode, and the fourth electrode each have at least one protrusion;
   a shape of the at least one protrusion of the first electrode matches a shape of the at least one protrusion of the third electrode and a shape of the at least one protrusion of the fourth electrode;
   a shape of the at least one protrusion of the second electrode matches a shape of the at least one protrusion of the third electrode and a shape of the at least one protrusion of the fourth electrode.

12. The touch structure according to claim 1, wherein an area of the second electrode is larger than an area of the first electrode and smaller than an area of a first touch electrode located in the main touch region; and an area of the fourth electrode is larger than an area of the third electrode and smaller than an area of a second touch electrode located in the main touch region; and/or
   shapes of the two first touch electrodes connected to the first connection portion of the adjustment connection unit and a shape of a first touch electrode located in the main touch region are different from one another; shapes of the two second touch electrodes connected to the second connection portion of the adjustment connection unit and a shape of a second touch electrode located in the main touch region are different from one another.

13. The touch structure according to claim 1, wherein at least one first touch electrode of the plurality of first touch electrodes is provided therein with at least one first dummy electrode, and a first dummy electrode is disconnected from a respective first touch electrode; and/or
   at least one second touch electrode of the plurality of second touch electrodes is provided therein with at least one first dummy electrode, and a first dummy electrode is disconnected from a respective second touch electrode.

14. The touch structure according to claim 13, wherein a first touch electrode or a second touch electrode located in the corner region is provided therein with at least one first dummy electrode, and a first touch electrode or a second touch electrode located in the main touch region is provided therein with at least one first dummy electrode; an area of a first dummy electrode in the first touch electrode or the second touch electrode located in the corner region is less than or equal to an area of a first dummy electrode in the first touch electrode or the second touch electrode located in the main touch region; and/or
   in the two first touch electrodes connected to the first connection portion of the adjustment connection unit, a first touch electrode, away from the center of the main touch region in the first direction, is provided therein with no first dummy electrode; in the two second touch electrodes connected to the second connection portion of the adjustment connection unit, a second touch electrode, away from the center of the main touch region in the second direction, is provided therein with no first dummy electrode.

15. The touch structure according to claim 1, further comprising:
   a plurality of first touch lines and a plurality of second touch lines, one or more first touch lines being electrically connected to the first electrode, one or more second touch lines being electrically connected to the third electrode;
   wherein an orthogonal projection of at least one first touch line of the plurality of first touch lines on the reference surface is non-overlapping with an orthogonal projection of at least one second touch line of the plurality of second touch lines on the reference surface; and/or
   the touch structure further comprising:
   a first conductive layer, an insulating layer and a second conductive layer that are sequentially stacked; the insulating layer being located between the first conductive layer and the second conductive layer, the insulating layer being provided therein with a plurality of via holes; wherein
   the first electrode, the second electrode, the third electrode, the fourth electrode and the first connection portion of the adjustment connection unit are disposed in the first conductive layer, and the second connection portion of the adjustment connection unit is disposed in the second conductive layer; the first electrode is directly electrically connected to the second electrode through the first connection portion in the first direction, the second connection portion is electrically connected to the third electrode and the fourth electrode through different via holes in the second direction; or
   the first electrode, the second electrode, the third electrode, the fourth electrode and the second connection portion of the adjustment connection unit are disposed in the first conductive layer, and the first connection portion of the adjustment connection unit is disposed in the second conductive layer; the third electrode is directly electrically connected to the fourth electrode through the second connection portion in the second direction, the first connection portion is electrically connected to the first electrode and the second electrode through different via holes in the first direction.

16. The touch structure according to claim 1, wherein the first connection portion and the second connection portion of the adjustment connection unit, the two first touch electrodes connected to the first connection portion of the adjustment connection unit, and the two second touch electrodes connected to the second connection portion of the adjustment connection unit are each of a metal mesh structure; and/or
   the plurality of first touch units intersect the second touch units to constitute a plurality of capacitive units; the plurality of capacitive units are arranged in a plurality of rows in the first direction and arranged in a plurality of columns in the second direction;
   the touch structure further comprises a second dummy electrode disposed in a gap region between capacitive units that are adjacent to one another.

17. A display panel, comprising:
a display substrate; and
the touch structure according to claim 1, wherein the touch structure is disposed on a light exit side of the display substrate.

18. A display device comprising the display panel according to claim 17.

19. The touch structure according to claim 6, wherein a shape of a protrusion includes a triangle, a rectangle, a trapezoid, a circle or an ellipse; and/or
   a height of a first branch is greater than a height of a protrusion.

20. A touch structure having a touch region, the touch region including a main touch region and a corner region, the corner region being located around the main touch region;

the touch structure comprising:
a plurality of first touch units extending in a first direction, wherein a first touch unit includes a plurality of first touch electrodes and a plurality of first connection portions, a first connection portion is electrically connected to two adjacent first touch electrodes;
a plurality of second touch units extending in a second direction, wherein a second touch unit includes a plurality of second touch electrodes and a plurality of second connection portions, a second connection portion is electrically connected to two adjacent second touch electrodes; the first direction intersects the second direction;
wherein an orthogonal projection of the first connection portion on a reference surface intersects an orthogonal projection of the second connection portion on the reference surface, the first connection portion and the second connection portion, whose orthogonal projections on the reference surface intersect each other, constitute a connection unit; at least one of a plurality of connection units composed of the plurality of first connection portions and the plurality of second connection portions is an adjustment connection unit, and the adjustment connection unit is located in the corner region;
in a first touch unit in which a first connection portion of the adjustment connection unit is located, a straight line passing through centers of at least two first touch electrodes located in the main touch region is a first reference line; in a second touch unit in which a second connection portion of the adjustment connection unit is located, a straight line passing through centers of at least two second touch electrodes located in the main touch region is a second reference line; an intersection point of the first reference line and the second reference line is a reference point; and
the reference point is located outside the corner region, and is located farther away from a center of the main touch region than the adjustment connection unit;
wherein the plurality of first touch units and the plurality of second touch units intersect one another to constitute a plurality of capacitive units; the plurality of capacitive units are arranged in a plurality of rows in the first direction, and arranged in a plurality of columns in the second direction;
a capacitive unit includes a single connection unit, opposite portions of two first touch electrodes connected to a first connection portion of the single connection unit, and opposite portions of two second touch electrodes connected to a second connection portion of the single connection unit;
a capacitive unit including the adjustment connection unit is a compensation capacitive unit, a capacitive unit located in a same row with and adjacent to the compensation capacitive unit is a first capacitive unit, a capacitive unit located in a same column with and adjacent to the compensation capacitive unit is a second capacitive unit;
the compensation capacitive unit, the first capacitive unit and the second capacitive unit are all located in the corner region; and
an area of the first capacitive unit and an area of the second capacitive unit are each larger than an area of the compensation capacitive unit, and are each smaller than an area of a capacitive unit located in the main touch region.

* * * * *